(12) United States Patent
Huang et al.

(10) Patent No.: US 12,437,136 B2
(45) Date of Patent: Oct. 7, 2025

(54) METHOD FOR INTRA-CELL-REPURPOSING DUMMY TRANSISTORS AND SEMICONDUCTOR DEVICE HAVING REPURPOSED FORMERLY DUMMY TRANSISTORS

(71) Applicants: TAIWAN SEMICONDUCTOR MANUFACTURING COMPANY, LTD., Hsinchu (TW); TSMC NANJING COMPANY, LIMITED, Nanjing (CN)

(72) Inventors: Yiyun Huang, Hsinchu (TW); Zhang-Ying Yan, Hsinchu (TW); Liu Han, Hsinchu (TW); Qingchao Meng, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 765 days.

(21) Appl. No.: 17/743,374

(22) Filed: May 12, 2022

(65) Prior Publication Data
US 2023/0342533 A1 Oct. 26, 2023

(30) Foreign Application Priority Data
Apr. 26, 2022 (CN) .......... 202210445466.7

(51) Int. Cl.
*G06F 30/392* (2020.01)
*G06F 30/33* (2020.01)
*G06F 111/20* (2020.01)
*G06F 119/06* (2020.01)
*G06F 119/18* (2020.01)

(52) U.S. Cl.
CPC ............ *G06F 30/392* (2020.01); *G06F 30/33* (2020.01); *G06F 2111/20* (2020.01); *G06F 2119/06* (2020.01); *G06F 2119/18* (2020.01)

(58) Field of Classification Search
USPC ........................................... 716/100
See application file for complete search history.

(56) References Cited

U.S. PATENT DOCUMENTS

| | | | | |
|---|---|---|---|---|
| 7,260,442 | B2 * | 8/2007 | Hwang ............... | G03F 1/84 |
| | | | | 700/121 |
| 9,256,709 | B2 * | 2/2016 | Yu ..................... | G03F 1/36 |
| 2010/0259296 | A1 | 10/2010 | Or-Bach | |
| 2014/0040838 | A1 * | 2/2014 | Liu ..................... | G03F 1/36 |
| | | | | 716/53 |
| 2014/0054710 | A1 * | 2/2014 | Choi .................. | H10D 62/822 |
| | | | | 257/E21.409 |

(Continued)

FOREIGN PATENT DOCUMENTS

CN 113517274 10/2021

*Primary Examiner* — Mohammed Alam
(74) *Attorney, Agent, or Firm* — Hauptman Ham, LLP

(57) ABSTRACT

In some embodiments, a method of generating a cell in a layout diagram includes: selecting a cell from a library of standard cells, components of the cell defining an active circuit; identifying a dummy device within the cell that is disconnected from the active circuit within the cell; and connecting the dummy device to a target node of the active circuit.

20 Claims, 22 Drawing Sheets

(56) References Cited

U.S. PATENT DOCUMENTS

2015/0278429 A1\* 10/2015 Chang .................. G03F 1/36
  716/52
2021/0110098 A1   4/2021 Biswas et al.
2022/0020738 A1   1/2022 Lai et al.

\* cited by examiner

METHOD FOR INTRA-CELL-REPURPOSING DUMMY TRANSISTORS AND SEMICONDUCTOR DEVICE HAVING REPURPOSED FORMERLY DUMMY TRANSISTORS

BACKGROUND

The integrated circuit (IC) industry produces a variety of analog and digital semiconductor devices to address issues in different areas. Developments in semiconductor process technology nodes have progressively reduced component sizes and tightened spacing resulting in progressively increased transistor density. ICs progressively become smaller.

In the context of semiconductor device manufacture, a design rule is a geometric constraint imposed on circuit board, semiconductor device, and/or IC designers to ensure that IC-designs function properly, reliably, and are produced with acceptable yield. Design rules are developed by process engineers based on the corresponding semiconductor process technology node. A type of electronic design automation (EDA) used to ensure that designers do not violate design rules is referred to as design rule checking (DRC). DRC is a step during physical verification signoff/approval regarding a given design. Physical verification signoff/approval further includes LVS (layout versus schematic) checks, XOR (logic) checks, electrical rule checks (ERC), antenna checks (the collection of charges from electromagnetic fields), or the like.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
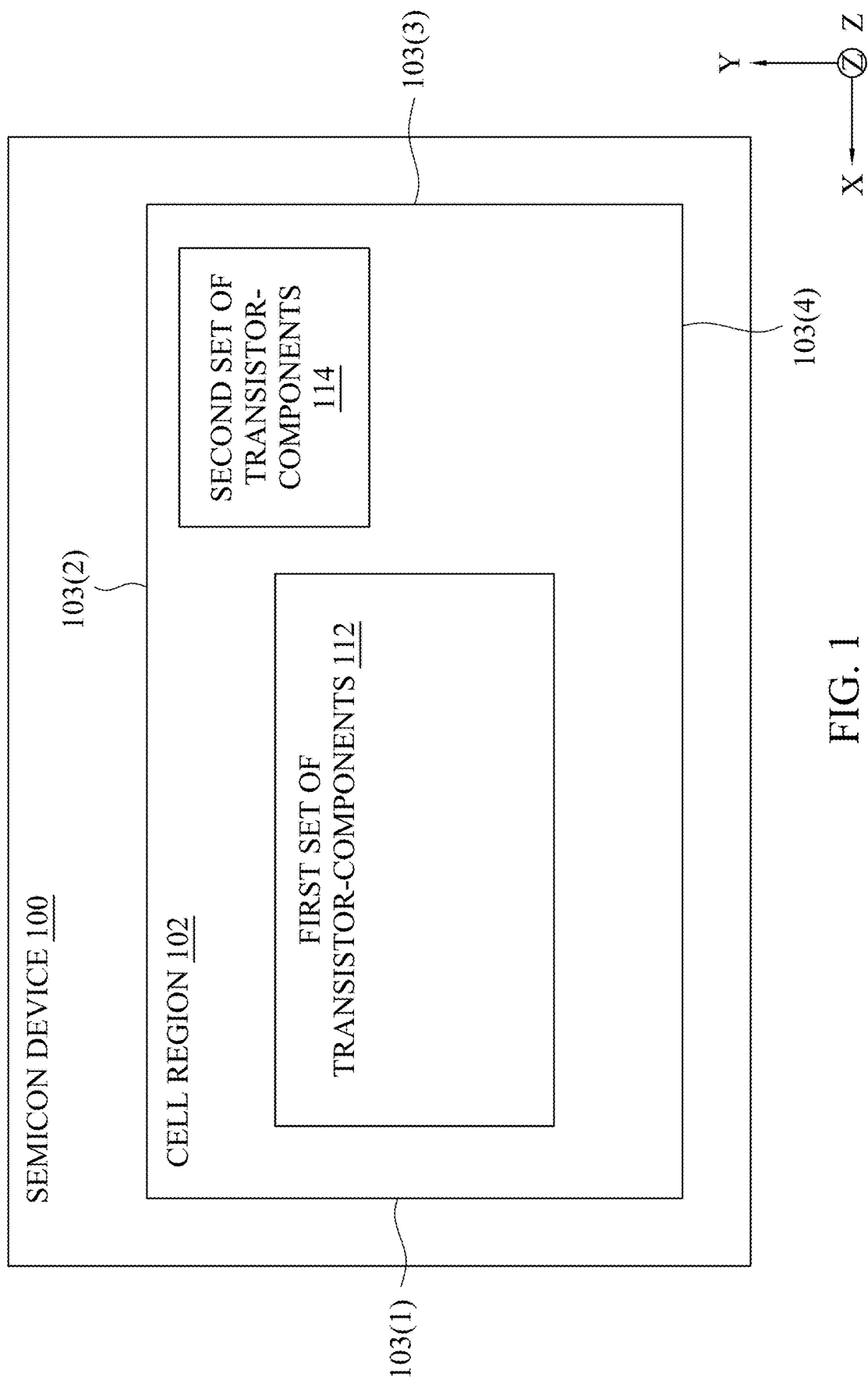
FIG. 1 is a block diagram of semiconductor device, in accordance with some embodiments.

The following disclosure discloses many different embodiments, or examples, for implementing different features of the subject matter. Examples of components, materials, values, steps, operations, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein are likewise interpreted accordingly. In some embodiments, the term standard cell structure refers to a standardized building block included in a library of various standard cell structures. In some embodiments, various standard cell structures are selected from a library thereof and are used as components in a layout diagram representing a circuit.

In some embodiments, a system and method are disclosed which reduce hold-slack violations in a given flip-flop design. According to another approach, for a given flip-flop design which suffers a hold-slack violation in a context of a larger time scale (i.e., equal to or greater than about 5 psec), modifications are made to the given flip-flop design which avoid the hold-slack violation but which enlarge the cell region/footprint of the modified flip-flop design relative to the footprint of the given flip-flop design. By contrast, relative to a given flip-flop design which suffers a hold-slack violation, in some embodiments, modifications to the given flip-flop design are disclosed which correspondingly reduce hold-slack time and thereby avoid a hold-slack violation albeit without having to enlarge the cell region area/footprint of the given flip-flop design. Furthermore, in some embodiments, in a context of a smaller time scale (i.e., less than about 5 psec), a system and method are disclosed which reduce hold-slack violations in a given flip-flop design.

In some embodiments, a method of revising a cell in a layout diagram to reduce a hold-slack violation of an active circuit of the cell includes identifying a dummy device within the cell that is disconnected from the active circuit within the cell; and repurposing the dummy device by connecting the dummy device as a passive device to a target node of the active circuit thereby to reduce the slack violation thereof. In some embodiments, such a method of intra-cell repurposing of a disconnected dummy (DD) device as a connected passive (CP) device is referred to as a DD2CP method. According to another approach referred to as a cell-padding technique and which is typically applied to transistors having fin-type field-effect transistor (fin-FET) architecture, for a given circuit design which suffers a hold-slack violation in a context of the larger time scale (i.e. equal to or greater than about 5 psec), isolation dummy gates and/or dummy transistors are added to the given circuit design to mitigate hold-slack violations of the given circuit design. However, the other approaches consequently suffer enlargement of the modified circuit's footprint relative to the given circuit's footprint because of the addition of the isolation dummy gates and/or dummy devices. By contrast, at least some embodiments are directed to the DD2CP method, i.e., to repurposing existing albeit disconnected dummy devices within a given circuit design, e.g., a flip-flop, as connected passive devices to mitigate slack violations. In some embodiments, such footprint-non-enlarging mitigation of hold-slack violations by the DD2CP method is not only used in the context of the larger time scale, but also is used in the context of a smaller time scale (i.e., less than about 5 psec).

In some embodiments, the identification of the dummy device includes the identification of a transistor having a shorted-configuration (shorted-transistor) as the dummy device, the shorted-transistor including a gate pattern, a first source/drain (S/D) region and a second S/D region which are connected together. In such embodiments, the method further includes adapting the shorted-transistor to a transistor having a capacitor-configuration (capacitor-configured transistor); and the connecting the dummy device to a target node includes using the capacitor-configured transistor as the dummy device. In such embodiments, the adapting the shorted-transistor includes removing one or more first conductive segment shapes which connect the gate pattern to each of the first and second S/D regions of the shorted-transistor; and generating a second conductive segment shape connecting a data input line shape of the active circuit with the gate pattern of the shorted-transistor. In such embodiments, the removing one or more first conductive segment shapes results not only in the gate pattern being disconnected from each of the first and second S/D regions but further results in the first and second S/D regions being disconnected from each other; and the adapting the shorted-transistor further includes generating a third conductive segment shape connecting the first and second S/D regions together.

In some embodiments, the target node is an input node of the active circuit; and the connecting the dummy device further includes connecting the dummy device in parallel with the input node of the active circuit. In some embodiments, the target node is an output node of an input transistor of the active circuit; and the connecting the dummy device further includes connecting the dummy device to the output node of the input transistor of the active circuit. In some embodiments, the target node is an output node of the active circuit; and the connecting the dummy device further includes connecting the dummy device to the output node of the active circuit. In some embodiments, the active circuit is a scan insertion D flip flop (SDFQ) that includes a multiplexer serially connected at an internal node to a D flip-flop (FF); the target node is the internal node of the SDFQ; and the connecting the dummy device further includes connecting the dummy device to the internal node. In some embodiments, the slack violation includes a hold type of slack violation and a setup type of slack violation; the identifying a dummy device and the connecting a dummy device are directed to reducing the hold type of slack violation; and the method further includes modifying a frequency of the active circuit thereby to reduce the setup type of slack violation.

In some embodiments, the adapting the dummy device is performed as part of an engineering change order (ECO). In chip design, ECO is the process of inserting a change directly into the netlist after it has already been processed by an automatic tool. Before the chip masks are made, ECOs are usually done to save time, by avoiding the need for full ASIC logic synthesis, technology mapping, place, route, layout extraction, and timing verification. EDA tools are often built with incremental modes of operation to facilitate this type of ECO.

Relevant terminology includes the following. Sequential logic refers to clocked or synchronous logic. In a synchronous circuit, an electronic oscillator is referred to as a clock (or clock generator) generates a sequence of repetitive pulses, i.e., a clock signal, which is distributed to all the memory elements in the circuit. The basic memory element in sequential logic is a flip-flop. The output of each flip-flop changes only when triggered by the clock pulse, so changes to the logic signals throughout the circuit all begin at the same time, at regular intervals, and are synchronized by the clock. The output of all the storage elements (flip-flops) in the circuit at any given time, which represents the binary data contained therein, is referred to as the state of the circuit. The state of the synchronous circuit changes only on clock pulses. At each cycle, the next state is determined by the current state and the value of the input signals when the clock pulse occurs.

When input data changes state, propagation delay refers to a finite amount of time needed by the logic gates to perform the operations on changed input data. A condition of valid operation is that the interval between clock pulses must be long enough so that all the logic gates have time to respond to the changes in the input data and have their corresponding outputs settle to stable logic values before the next clock pulse occurs. In general, when the condition is met, the circuit is stable and reliable.

Setup time is the minimum time that a signal must be stable before the clock rising edge. When the setup time is not adequate, there is a risk that a logical state of the signal will be misinterpreted. More particularly, when the setup time is not adequate, there is a risk that the signal will not settle into a first range of voltages which clearly represents a logical zero or a third range of voltages which clearly represents a logical one, but instead will remain in an intermediate second range of voltages which does not clearly represent either a logical zero or a logical one, resulting in the possibility of that an incorrect interpretation of the logical state of the signal will be entered into a register, i.e., latched. Setup-slack is the difference in time between when the signal becomes valid and the setup time. In other words, when the setup-slack is positive, then the signal becomes valid sooner than required by the setup time. When the setup-slack is negative, then the signal becomes valid after the point in time required by the setup time. In general, though a large positive setup-slack avoids signal-state misinterpretation, nevertheless a large positive setup-slack is undesirable because a significant portion of the large positive setup-slack represents delay that could be avoided. Accordingly, in general, the setup-slack is targeted for a near zero, positive number.

Hold time is the shortest time that a signal must be stable after the clock rising edge. When the hold time is not met, there is a risk that an incorrect interpretation of the logical state of the signal will be entered into a register, i.e., latched. Hold-slack is the difference in time between when the signal becomes valid and the hold time. In other words, when hold-slack is positive, then the signal remains valid longer than required by the hold time. When the hold-slack is negative, then the signal remains valid too briefly, i.e., the signal remains valid for an shorter amount of time than is required by hold time. In general, though a large positive hold-slack avoids signal-state misinterpretation, nevertheless a large positive hold-slack is undesirable because a significant portion of the large positive hold-slack represents delay that could be avoided. Accordingly, in general, the hold-slack is targeted for a near zero, positive number.

A hold fix or adjustment of hold-slack is commonly performed before tape out (tape-out or tapeout is the final result of the design process for semiconductor devices or printed circuit boards before they are sent for manufacturing). As technology nodes progress and semiconductor devices correspondingly decrease in size, hold fixes become more difficult as semiconductor devices include increasing amounts of corners and additional modes. Other approaches incorporate standard cells such as buffer cells and delay cells to perform hold fixes. While these other approaches to hold fixes can be effective in a context of the larger time scale, i.e., hold-slack violations that equal to or greater than about 5 psec, the other approaches are not effective against hold-slack violations in the context of the smaller time scale, i.e., hold-slack violations that are less than about 5 psec. In some embodiments, again, in a context of the smaller time scale (i.e., less than about 5 psec), a system and method are disclosed which reduce hold-slack violations in a given circuit design, e.g., flip-flop design.

Slack violations are most commonly diagnosed or discovered during static timing analysis (STA), which is part of an EDA process. In contrast to a lengthier and more computationally expensive full simulation of the entire logical operation of a circuit design, STA represents the circuit design as a set of timing paths, calculates corresponding signal-propagation delays along the timing paths and checks for violations of timing constraints. High-performance integrated circuits have traditionally been characterized by the clock frequency at which they operate. Measuring the ability of a circuit to operate at the specified speed is performed by measuring, during the design process, the circuits delay at numerous steps. In a context of the smaller time scale (i.e., less than about 5 psec), hold-slack violations can be prevalent. For example, in the smaller time scale context, hold-slack violations for some static random access memory (SRAM) designs account for nearly 50% of all design rule violations of the SRAM designs.

As discussed above, other approaches have incorporated isolation dummy gates to perform hold fixes in the context of the larger time scale, i.e., hold slack violations equal to or greater than about 5 psec. However, the timing impact from layout dependent effects (LDE) become more and more pronounced in advanced technology nodes. Isolation dummy gates have an impact on flip-flop performance in that timing uncertainty is introduced by the effect of isolation dummy gates on transistor voltage threshold (Vt). The change in Vt gives rise, not only to mismatch effects, but also to significant performance changes.

As discussed above, and typically with respect to fin-FET architecture, other approaches have incorporated cell padding to eliminate timing uncertainty in the context of the larger time scale, i.e., hold slack violations of greater than about 5 psec. Typically, a cell is padded by expanding the cell footprint to add dummy devices on both sides of an active circuit. For example, a 2 contact poly pitch (CPP) dummy device is added to each of the right and left sides of a device under test (DUT), such as a sequential logic circuit. However, in the smaller time scale of advanced technology nodes where the hold-slack violations are less than about 5 psec, the hold time and setup times are worsened, i.e., increased, by each additional dummy device incorporated. Thus, for the smaller time scale, the cell-padding technique is not effective for mitigating hold-slack violations. For advanced technology nodes, the use of dummy devices do not provide a realistic solution for slack time fixes. In some embodiments, again, in a context of the smaller time scale (i.e., less than about 5 psec), a system and method are disclosed which reduce hold-slack violations in a given circuit design, e.g., flip-flop design.

FIG. 1 is a block diagram of semiconductor device 100, in accordance with some embodiments.

Semiconductor device 100 includes cell region 102 that includes a left side boundary 103(1), an upper/top cell boundary 103(2), a right side boundary 103(3) and a lower/bottom cell boundary 103(4). In general, boundaries of cell regions in semiconductor devices are discerned in a variety of ways, some examples of which follow. In some embodiments in which long axes of active regions extend in a first direction, e.g., parallel to the X-axis, a left boundary of a cell region corresponds approximately to a first imaginary line to which align left-ends of a first subset of the active regions, the first subset including a majority of the active regions that align, and a right boundary of a cell region corresponds approximately to a second imaginary line to which align right-ends of a second subset of the active regions, the second subset including a majority of the active regions that align. In some embodiments in which long axes of active regions extend parallel to a first direction, e.g., the X-axis, and long axes of gate segments extend parallel to a second direction perpendicular to the first direction, e.g., the Y-axis, and a left boundary and/or right boundary of a cell region corresponds approximately to an instance of a gate segment which has been replaced by an isolation dummy gate (discussed below). In some embodiments in which long axes of active regions and long axes of power rails extend in a first direction, e.g., the X-axis, an upper/top boundary and/or a lower/bottom boundary of a cell region corresponds approximately to an instance of a power rail.

Cell region 102 includes a first set of transistor-components 112 and a second set of transistor-components 114. In some embodiments, cell region 102 includes a sequential logic circuit. In some embodiments, cell region 102 includes a flip-flop. In some embodiments, cell region 102 includes a D flip-flop. In some embodiments, cell region 102 includes a scan insertion D flip-flop (SDFQ).

Transistor-components 112 of the first set are connected as corresponding active transistors that define a functional circuit. Transistor-components 114 of the second set are connected as one or more corresponding capacitor-configured-transistors. Cell region 102 is a rectangular area that has a minimal size sufficient to accommodate the transistor-components. In some embodiments, cell region 102 is as shape other than rectangular such as square, oval, circular, or any other shape in accordance with some embodiments. In some embodiments, one or more of the active transistors are configured to receive data at a data-input node (see FIGS. 4A-4F) of cell region 102 and a clock buffer at a timing-input node (see FIGS. 4A-4F) of cell region 102. In some embodiments, one or more of the active transistors are configured to produce an output signal at an output node (see FIGS. 4A-4F) of cell region 102. The functional circuit represents a modified version of a given circuit design which suffered a hold violation. Modifications made to reduce the hold violation which resulted in the functional circuit include a connection between a terminal corresponding to the one or more capacitor-configured transistors of the second set and a target node (see FIGS. 4A-4F) of the functional circuit. In some embodiments, the target node is the input node of cell region 102. In some embodiments, the target node is the output node of the cell region. In some embodiments, the target node is an internal node (see FIGS. 4A-4F) to a D flip-flop. In some embodiments, the target node is an output node of an input transistor of the active circuit.

Cell boundaries 103(1)-103(4) are imaginary boundaries of cell region 102. In some embodiments, cell boundaries 103(1)-103(4) are represented, in effect, by corresponding features of the cell region 102. In some embodiments, cell boundaries 103(1)-103(4) are boundaries set by other cell regions (not shown) which abut cell region 102.

FIGS. 2A-2D are layout diagrams of corresponding cells 212A-212D representing corresponding cell regions in semiconductor devices, in accordance with some embodiments.

Figure 2A:
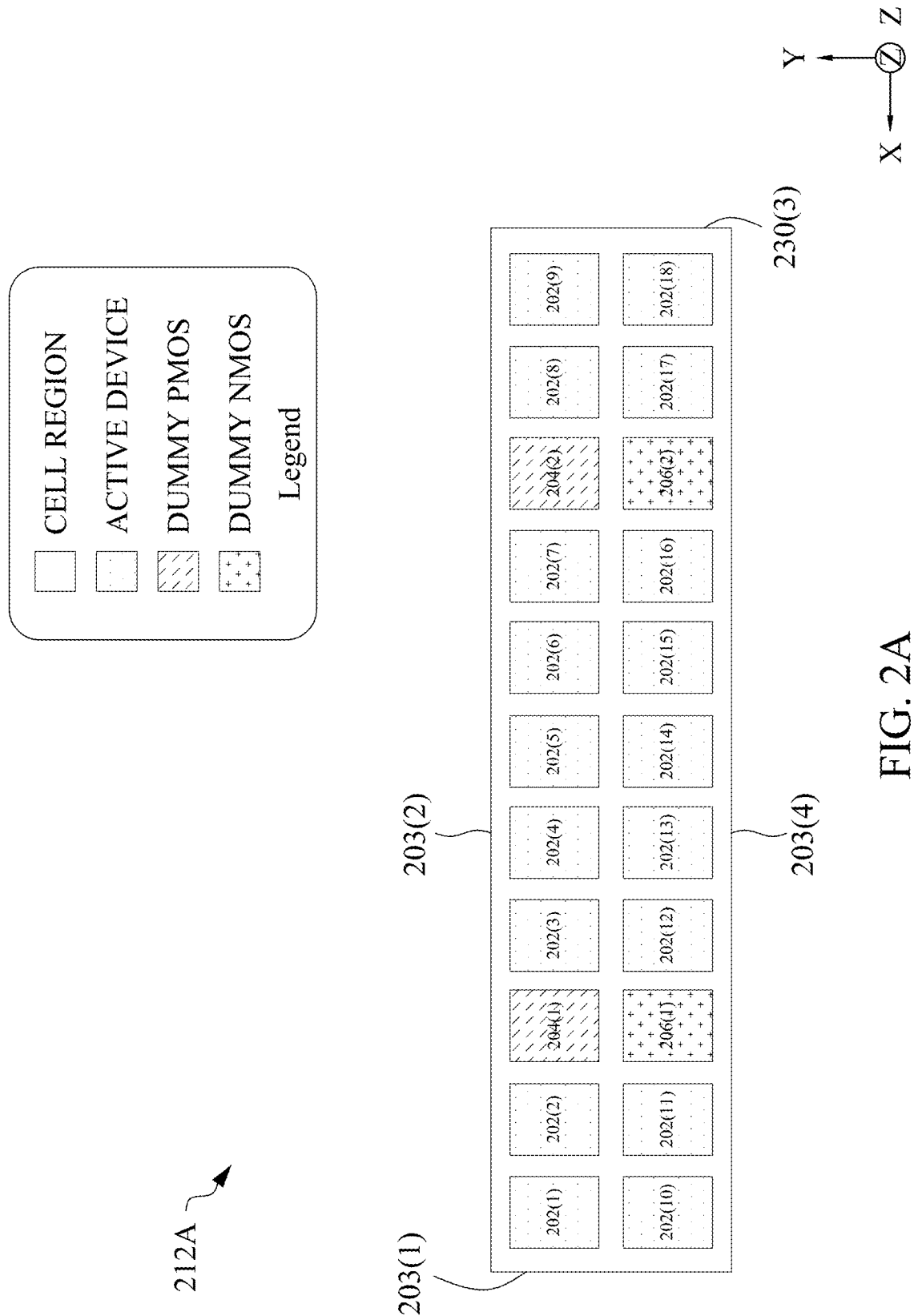
FIGS. 2A, 2B, 2C and 2D are corresponding layout diagrams of a semiconductor device, in accordance with some embodiments.
Figure 2B:
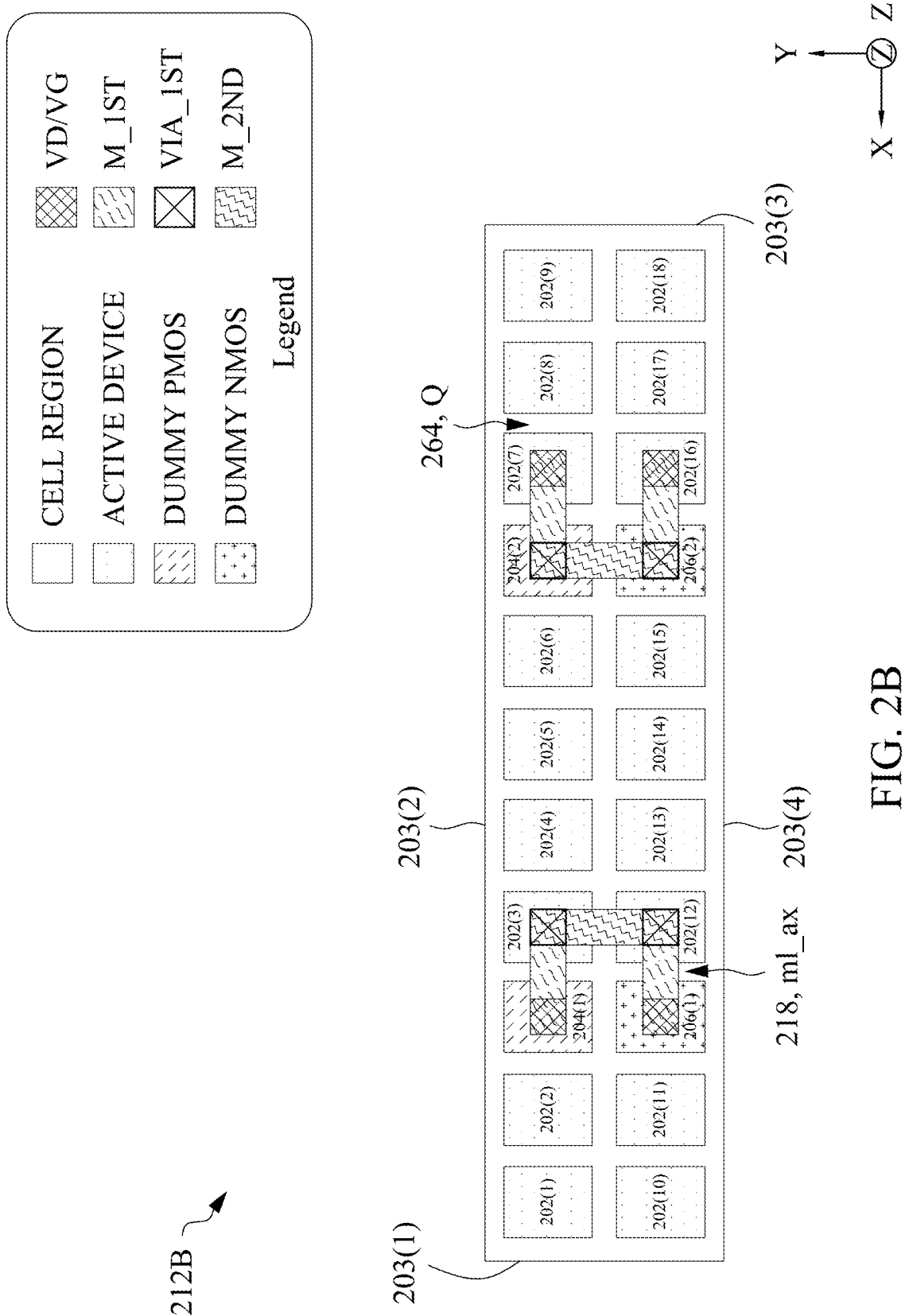
Figure 2C:
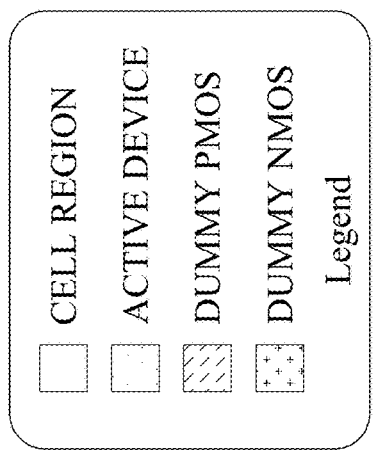
Figure 2C:
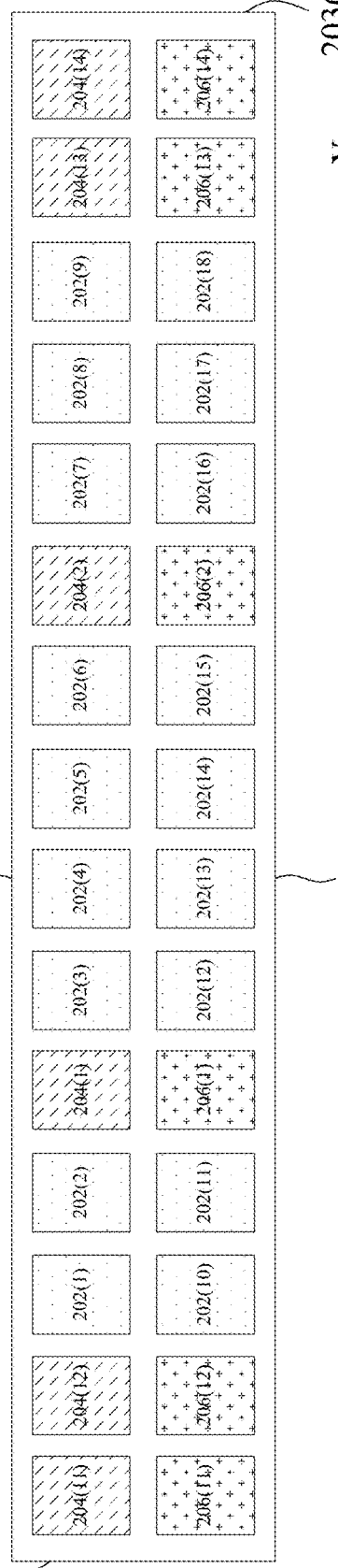
Figure 2D:
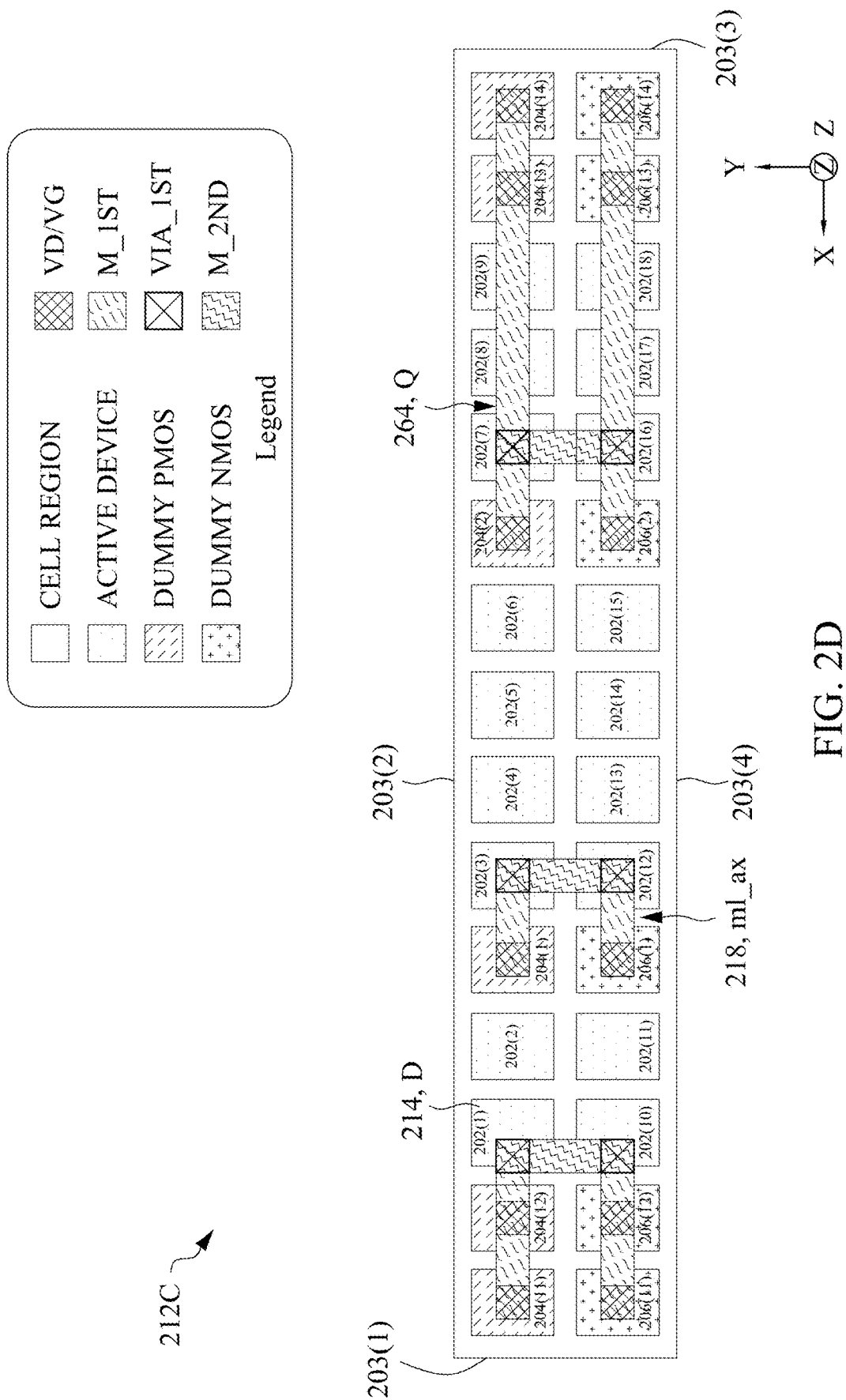

The contrast between FIG. 2B & FIG. 2A and the contrast between FIG. 2D & FIG. 2C help to illustrate the method of intra-cell repurposing of a disconnected dummy (again, DD) device as a connected passive (again, CP) device, i.e., the DD2CP method, in accordance with some embodiments.

In general, a layout diagram represents a semiconductor device. Shapes in the layout diagram represent corresponding components in the semiconductor device. The layout diagram per se is a top view. Shapes in the layout diagram are two-dimensional relative to, e.g., the X-axis and the Y-axis. The semiconductor device being represented is three-dimensional. Typically, relative to the Z-axis, the semiconductor device is organized as a stack of layers in which are located corresponding structures, i.e., to which belong corresponding structures. Accordingly, each shape in the layout diagram represents, more particularly, a component in a corresponding layer of the corresponding semiconductor device. Typically, the layout diagram represents relative depth, i.e., position relative to the Z-axis, of shapes and thus layers by superimposing a second shape on a first shape so that the second shape at least partially overlaps the first shape.

Layout diagrams vary in terms of the amount of detail represented. In some circumstances, selected layers of a layout diagram are combined/abstracted into a single layer, e.g., for purposes of simplification. Alternatively, and/or additionally, in some circumstances, not all layers of the corresponding semiconductor device are shown, i.e., selected layers of the layout diagram are omitted, e.g., for simplicity of illustration. FIGS. 2A-2D are examples of layout diagrams in which selected layers have been combined/abstracted and in which selected layers have been omitted, as discussed below.

In some embodiments, each of cells 212A-212D of corresponding FIGS. 2A-2D is an example of cell region 102 of semiconductor device 100. Cells 212A-212D include cell boundaries 203(1), 203(2), 203(3) and 203(4), which correspond to cell boundaries 103(1)-103(4) of cell region 102 of semiconductor device 100.

In FIGS. 2A-2D, corresponding cells 212A-212B include active device regions 202(1)-202(18), dummy positive-channel metal oxide semiconductor (PMOS) regions 204(1)-204(2) and dummy negative-channel metal oxide semiconductor (NMOS) regions 206(1)-206(2) in a transistor layer. In FIGS. 2C-2D, corresponding cells 212C-212D further include dummy PMOS regions 204(11)-204(14) and dummy NMOS regions 206(11)-206(14). Each of active device regions 202(1)-202(18) represents an active transistor such that the combination of active regions 202(1)-202(18) represent, e.g., the active transistors formed from transistor-components 112 of the first set (see discussion of FIG. 1). The active transistors represented by active device regions 202(1)-202(18) define a functional circuit (see FIGS. 4A-4F). Active device regions 202(1)-202(18) correspondingly are PMOS or NMOS regions depending upon the functional circuit defined by the active transistors represented by active device regions 202(1)-202(18). In some embodiments, active device regions 202(1)-202(9) are PMOS device regions and active device regions 202(10)-202(18) are NMOS device regions. Each of dummy PMOS regions 204(1)-204(2) and dummy NMOS regions 206(1)-206(2) represents a dummy transistor device such that the combination of dummy PMOS regions 204(1)-204(2) and dummy NMOS regions 206(1)-206(2) represent, e.g., the dummy transistors formed from transistor-components 114 of the second set (see discussion of FIG. 1).

In each of FIGS. 2A-2D, the transistor layer is an example of a combination/abstraction of multiple layers into a single layer, for simplicity of illustration. In some embodiments, relative to a semiconductor device based on a larger diagram which includes cells 212A-212C of corresponding FIGS. 2A-2C, the transistor layer includes: a sub-layer (not shown) corresponding to a substrate in which active regions (not shown) are formed, wherein source/drain (S/D) regions (not shown) are formed correspondingly in the active regions; an MD sub-layer (not shown) that includes gate segments (not shown) and metal-to-source/drain (MD) contact structures (not shown), the latter being for coupling the S/D regions in the active regions to corresponding VD/VG structures (FIGS. 2B & 2D); and a VD/VG sub-layer (not shown) that includes VD/VG structures (FIGS. 2B-2C), wherein VD/VG structures include via-to-source/drain (VD) structures (not shown) for connecting MD contact structures to corresponding M_1st segments (FIGS. 2B & 2D) in a first layer of metallization (M_1st layer) (not shown) and via-to-gate (VG) structures (not shown) for connecting gate segments to corresponding M_1st segments.

Whereas the active transistors represented by active regions 202(1)-202(18) define a functional circuit in FIGS. 2A-2D, each of the dummy transistors represented by dummy PMOS regions 204(1)-204(2) and NMOS regions 206(1)-206(2) in FIG. 2A is disconnected from the function circuit of cell 212A. The dummy transistors represented by dummy PMOS regions 204(1)-204(2) and NMOS regions 206(1)-206(2) are examples of DD devices which are subjected to intra-cell-repurposing according to the DD2CP method.

In some embodiments, the dummy transistor represented by one or more of dummy PMOS regions 204(1)-204(2) and/or NMOS regions 206(1)-206(2) has a capacitor-configuration which nevertheless is disconnected from the functional circuit of cell 212A of FIG. 2A. In some embodiments, the dummy transistor represented by one or more of dummy PMOS 204(1) and 204(2) and/or NMOS regions 206(1) and 206(2) has a shorted-configuration in which the gate, drain, and source are connected together (FIG. 3B); the shorted-configuration prevents the dummy transistor from conducting current.

In some embodiments, the functional circuits defined by cells 212A-212D are corresponding sequential logic devices. In some embodiments, the functional cells defined by cells 212A-212D define corresponding flip-flop cells.

FIGS. 2A-2D assume the following regarding active regions, e.g., 202(1), dummy PMOS regions, e.g., 204(1) and dummy NMOS regions 206(1): they have the same width (relative to the X-axis) and height (relative to the Y-axis) and so have the same area, referred to herein as unit area; and they are spaced apart (pitched) uniformly relative to each of the X-axis and the Y-axis. Accordingly, in some embodiments and in terms of unit area, cell 212A is described as having a footprint that is 11 units wide and 2 units tall.

Regarding FIG. 2A, in some embodiments, an aspect included in the intra-cell-repurposing according to the DD2CP method is subjecting cell 212A to a slack violation analysis, e.g., static timing analysis (STA), to determine if any slack violations are diagnosed or discovered. STA is a simulation method of computing the expected timing of a synchronous digital circuit without requiring a simulation of the full circuit. In response to results of the STA of cell 212A indicating no slack violations and otherwise acceptable slack times (e.g., not overly large slack times), cell 212A is deemed ready to enter the next phase of circuit design development. However, in response to the results of the STA of cell 212A indicating a hold-slack violation, a design engineer considers making a modification to cell 212A as a hold-slack mitigation i.e., considers making a hold fix. An example of subjecting cell 212A to a hold-slack mitigation, i.e., of subjecting cell 212A to a hold fix, is subjecting cell 212A to the intra-cell-repurposing according to the DD2CP method.

Regarding FIG. 2B, cell 212B shows the results of having subjected cell 212A to a hold-slack mitigation, i.e., having subjected cell 212A to a hold fix. More particularly, cell 212B shows the results of having subjected cell 212A to intra-cell-repurposing according to the DD2CP method. FIG. 2B assumes that the dummy transistor represented by each of dummy PMOS regions 204(1)-204(2) and NMOS dummy regions 206(1)-206(2) of cell 212A of FIG. 2A has a capacitor-configuration which nevertheless is disconnected from the functional circuit defined by the transistors represented by active device regions 202(1)-202(18).

In FIG. 2B, a first mitigating connection-path has been established which connects one terminal of each of the capacitor-configured dummy transistors represented by each of dummy PMO region 204(1) and NMOS dummy region 206(1) to a node 218 that is common to the transistors represented by active device regions 202(3) and 202(12). The first mitigating connection-path includes corresponding M_1st segments, corresponding VIA_1st vias in a first layer of interconnection (VIA_1st layer) (not shown), and a corresponding M_2nd segment in a second layer of metallization (M_2nd layer) (not shown). The first mitigating connection-path is a first hold fix. In some embodiments in which cell 212B defines an SDFQ, node 218 has a signal ml_ax (FIGS. 4A-4E). In some embodiments in which cell 212B defines an SDFQ, signal ml_ax is an input signal to a D flip-flop (FF) of the SDFQ.

Also in FIG. 2B, a second mitigating connection-path has been established which connects one terminal of each of the capacitor-configured dummy transistors represented by each of dummy PMO region 204(2) and NMOS dummy region 206(2) to a node 264 that is common to the transistors represented by active device regions 202(7) and 202(16). The second mitigating connection-path includes corresponding M_1st segments, corresponding VIA_1st vias and a corresponding M_2nd segment. The second mitigating connection-path is a second hold fix. In some embodiments in which cell 212B defines an SDFQ, node 264 has a signal Q (FIGS. 4A-4E).

Regarding FIG. 2B, in terms of footprint, the first and second hold fixes do not increase the footprint of cell 212B as compared to cell 212A. Cell 212B has a footprint that is 11 units wide and 2 units tall, which is the same as cell 212A.

In some embodiments in which one of or more of the dummy transistor represented correspondingly by dummy PMOS regions 204(1) and 204(2) and dummy NMOS regions 206(1) and 206(2) has the shorted-configuration, before the first and second mitigating connection-paths are established, each shorted-configuration is converted to a capacitor-configuration.

FIG. 2C is a version of FIG. 2A which assumes: the transistors represented by active regions 202(1)-202(18), dummy PMOS regions 204(1)-204(2) and dummy NMOS 206(1)-206(2) have the fin-FET architecture; and the functional circuit of cell 212A defined by the active transistors represented by active regions 202(1)-202(18) has a hold-slack violation.

In FIG. 2C, the cell padding technique has been applied to cell 212A of FIG. 2A by adding dummy PMOS regions 204(11)-204(12) and dummy NMOS regions 206(11)-206(12) adjacent left side boundary 203(1) of cell 212A, and dummy PMOS regions 204(13)-204(14) and dummy NMOS regions 206(13)-206(14) adjacent right side boundary 203(3) of cell 212A, resulting in cell 212C of FIG. 2C. FIG. 2C assumes that the cell-padding technique has resolved the hold-slack violation in a context of the larger time scale (i.e., equal to or greater than about 5 psec), but has not resolved the hold-slack violation in the context of the smaller time scale (i.e., less than about 5 psec). To resolve the hold-slack violation in the context of the smaller time scale, cell 212C of FIG. 2C is subjected to a hold-slack mitigation, i.e., is subjected to intra-cell-repurposing according to the DD2CP method.

Regarding FIG. 2D, cell 212D shows the results of having subjected cell 212C to a hold-slack mitigation, i.e., having subjected cell 212C to a hold fix. More particularly, cell 212D shows the results of having subjected cell 212C to intra-cell-repurposing according to the DD2CP method. FIG. 2D assumes that the dummy transistor represented by each of dummy PMOS regions 204(1)-204(2) and 204(11)-204(14) and NMOS dummy regions 206(1)-206(2) and 206(11)-206(14) of cell 212C of FIG. 2C has a capacitor-configuration which nevertheless is disconnected from the functional circuit defined by the transistors represented by active device regions 202(1)-202(18).

In FIG. 2D, a first mitigating connection-path has been established which is the same as the first mitigation path in cell 212B of FIG. 2B. Additionally, a second mitigating connection-path has been established which is an extension of the second mitigation path in cell 212B of FIG. 2B. More particularly, the second mitigation path of cell 212D additionally connects one terminal of each of the capacitor-configured dummy transistors represented by each of dummy PMOS regions 204(13)-204(14) and NMOS dummy regions 206(13)-216(14) to node 264.

Also in FIG. 2D, a third mitigating connection-path has been established which connects one terminal of each of the capacitor-configured dummy transistors represented by each of dummy PMOS regions 204(11)-204(12) and NMOS dummy regions 206(11)-206(12) to a node 214 that is common to the transistors represented by active device regions 202(1) and 202(2). The third mitigating connection-path includes corresponding M_1st segments, corresponding VIA_1st vias and a corresponding M_2nd segment. The third mitigating connection-path is a third hold fix. In some embodiments in which cell 212D defines an SDFQ, node 214 has a signal D (FIGS. 4A-4E).

Regarding FIG. 2D, in terms of footprint, the first, second and third hold fixes do not increase the footprint of cell 212D as compared to cell 212C of FIG. 2C. Cell 212D has a footprint that is 15 units wide and 2 units tall, which is the same as cell 212C.

In some embodiments in which one of or more of the dummy transistor represented correspondingly by dummy PMOS regions 204(11) and 204(12) and dummy NMOS regions 206(11) and 206(12) has the shorted-configuration, before the first, second and third mitigating connection-paths are established, each shorted-configuration is converted to a capacitor-configuration.

Figure 3B:
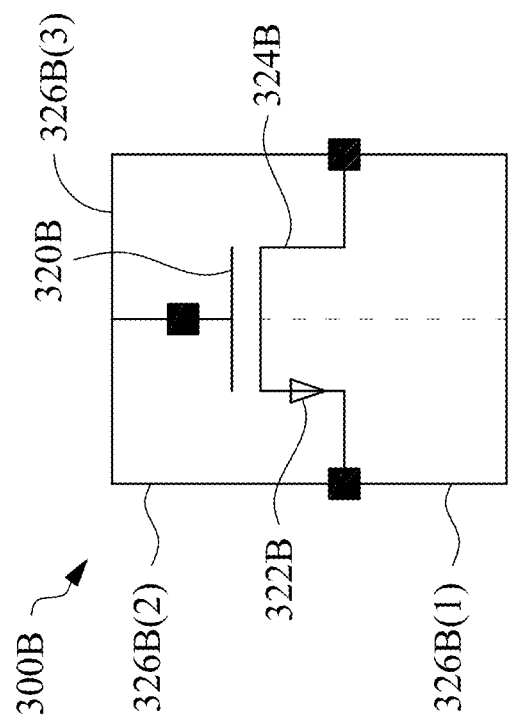
FIG. 3B is a schematic diagram of a dummy transistor, in accordance with some embodiments.
Figure 3A:
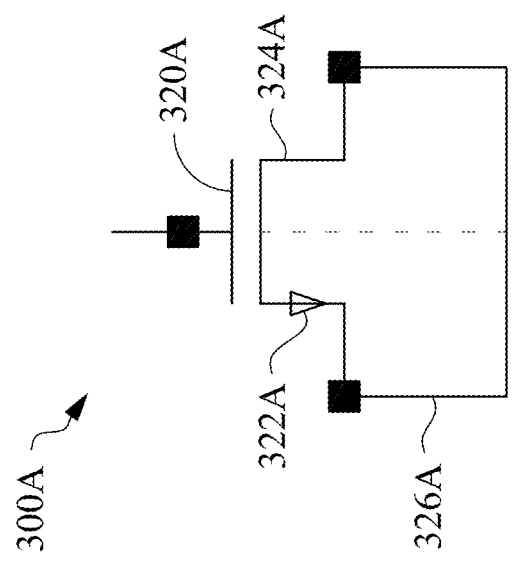
FIG. 3A is a schematic diagram of a capacitor-configured transistor, in accordance with some embodiments.

FIG. 3A is a schematic diagram of a capacitor-configured transistor 300A, in accordance with some embodiments.

In some embodiments, capacitor-configured-transistor 300A is an example of one or more of the capacitor-configured transistors represented by dummy PMOS regions 204(1)-204(2) and dummy NMOS regions 206(1)-206(2) in FIGS. 2A-2D, and dummy PMOS regions 204(11)-204(14) and dummy NMOS regions 206(11)-206(14) in FIGS. 2C-2D. Capacitor-configured-transistor 300A includes: a gate 320A which represents a first capacitor-plate; and a first source/drain (S/D) 322A and a second S/D 324A which are connected together by conductor 326A and which represent a second capacitor plate. In some embodiments, a body-bias (bulk-bias) terminal of transistor 300A also is connected to conductor 326A. In some embodiments, the first-capacitor plate is connected to a node of a functional circuit and the second capacitor-plate is left floating. In some embodiments, the second-capacitor plate is connected to a node of a functional circuit and the first capacitor-plate is left floating.

FIG. 3B is a schematic diagram of a shorted-transistor 300B, in accordance with some embodiments.

In some embodiments, shorted-transistor 300B is an example of one or more of the shorted-transistors represented by dummy PMOS regions 204(1)-204(2) and dummy PMOS regions 206(1)-206(2) in FIGS. 2A-2D, and dummy PMOS regions 204(11)-204(14) and dummy PMOS regions 206(11)-206(14) in FIGS. 2C-2D. Shorted-transistor 300B includes a gate 320B, a first source/drain (S/D) 322B and a second S/D 324B. First S/D 322B and second S/D 324B are connected together by conductor 326B(1). First S/D 322B and gate 320B are connected together by conductor 326B (2). Gate 320B and second S/D 324B are connected together by conductor 326B(3). In some embodiments, a body-bias (bulk-bias) terminal of transistor 300B also is connected to conductor 326B(1).

Figure 4A:
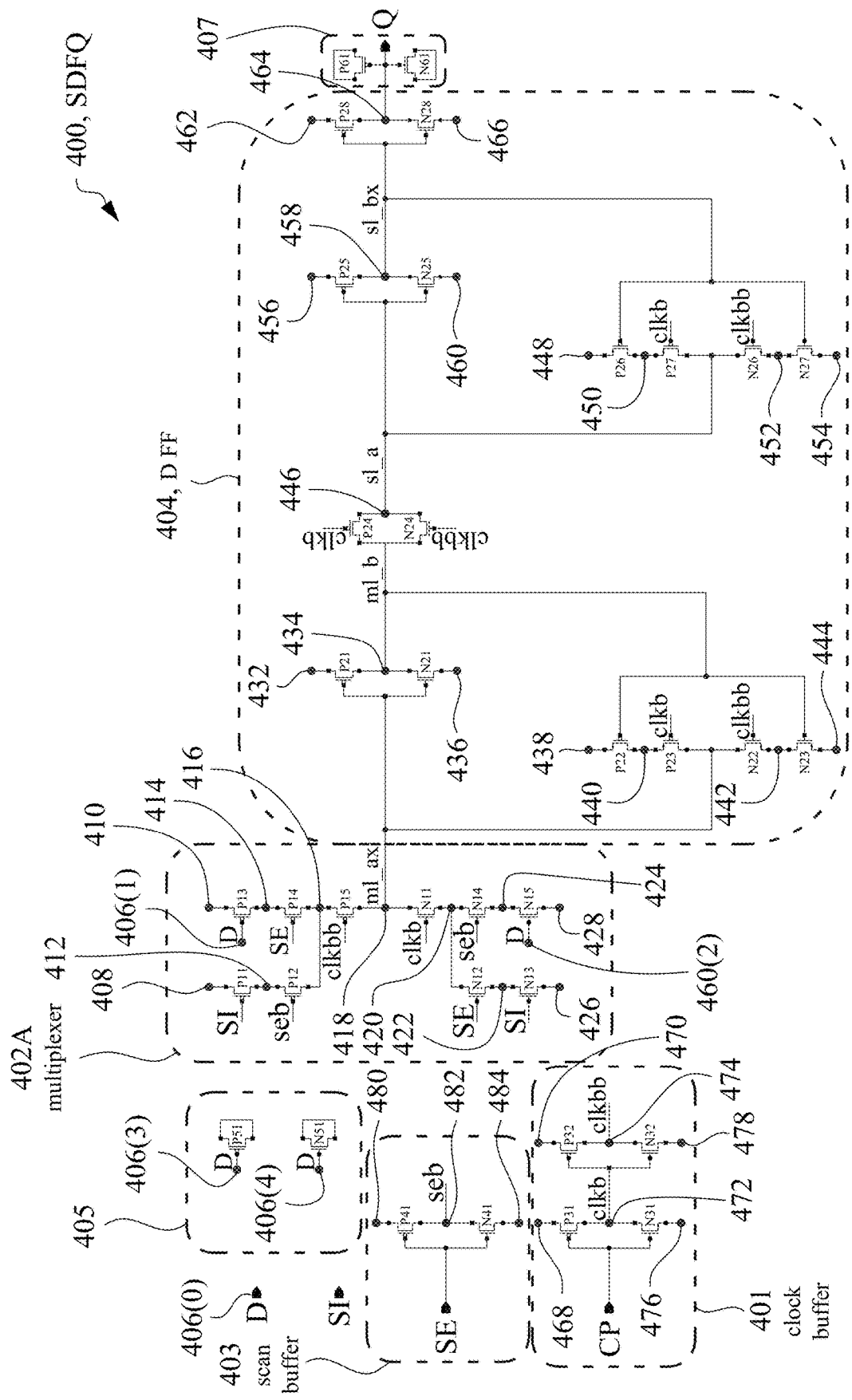
FIGS. 4A, 4B, 4C, 4D, 4E, and 4F are corresponding schematic diagrams of a semiconductor device, in accordance with some embodiments.

FIG. 4A is a schematic diagram of a circuit 400, in accordance with some embodiments.

FIGS. 4B, 4C, 4D, 4E, and 4F are corresponding schematic diagrams of corresponding circuits 402B, 402C, 402D and 402E, in accordance with some embodiments.

In some embodiments, circuit 400 is an example of the functional circuit defined by transistor components 112 and transistor components 114 of FIG. 1. In some embodiments, circuit 400 is an example of a functional circuit defined by the transistors represented by active regions 202(1)-202(18), PMOS regions 204(1)-204(2) and NMOS regions 206(1)-206(2) of FIG. 2B or active regions 202(1)-202(18), PMOS regions 204(1)-204(2) & 204(11)-204(14) and NMOS regions 206(1)-206(2) and 206(11)-206(14) of FIG. 2D.

In FIG. 4A, circuit 400 is a scan insertion D flip-flop (SDFQ). SDFQ 400 includes a multiplexer 402A, a D flip-flop 404, a clock buffer 401, a scan buffer 403, a first pair 405 of uncoupled capacitor-configured-transistors, and a second pair 407 of capacitor-configured-transistors. In some embodiments, one of pair 405 or pair 407 is not included in SDFQ 400.

SDFQ 400 is a result of having subjected a predecessor SDFQ (not shown) to intra-cell-repurposing according to the DD2CP method. More particularly, the inclusion of pair 405 and pair 407 of correspondingly capacitor-configured-transistors in SDFQ is a result of having subjected the predecessor SDFQ (not shown) to intra-cell-repurposing according to the DD2CP method.

In FIG. 4A, pair 405 of capacitor-configured-transistors includes capacitor-configured-transistors P51 and N51. One capacitor-plate of each of capacitor-configured-transistors P51 and N51 is connected to an input node 406(0) of SDFQ 400, which receives an input signal D. More particularly, each of a gate terminal 406(3) of capacitor-configured-transistor P51 and a gate terminal 406(4) of capacitor-configured transistor N61 is connected to input node 406(0) of SDFQ 400. In addition, a gate terminal 406(1) of a transistor P13 and a gate terminal 406(2) of a transistor N15, discussed below, are also connected to input node 406(0).

Pair 405 of capacitor-configured-transistors represents a first hold-fix having been applied to SDFQ 400. Pair 405 of capacitor-configured transistors affects hold-slack of SDFQ 400 by altering a data path of an input data signal at input node 406(0), e.g., by increasing the capacitance at input node 406(0). In some embodiments, assuming an input signal having a current state representing a logical value of one and a previous state representing a logical value of zero, as the input signal stabilizes into the current state at input node 406(0), the input signal first charges capacitor-configured-transistors P51 and N51 (P51 and N51 having been discharged by the previous state of the input signal). This charging takes a small amount of time, but nevertheless delays the stabilization of the data signal by an amount sufficient to affect the hold-slack of SDFQ 400 in a helpful manner. In some embodiments, assuming an input signal having a current state representing a logical value of zero and a previous state representing a logical value of one, as the input signal stabilizes into the current state at input node 406(0), the input signal first discharges capacitor-configured-transistors P51 and N51 (P51 and N51 having been charged by the previous state of the data signal). This discharging takes a small amount of time, but nevertheless delays the stabilization of the input signal by an amount sufficient to affect the hold-slack of SDFQ 400 in a helpful manner.

In FIG. 4A, pair 407 of capacitor-configured-transistors includes capacitor-configured-transistors P61 and N61. One capacitor-plate of each of capacitor-configured-transistors P61 and N61 is connected to output node 464. More particularly, the gate terminal of each of capacitor-configured-transistors P61 and N61 is connected to output node 464. For purposes of discussion and efficiency, a device referred to as a Pxx transistor is a PMOS device and a device referred to as a Nxx transistor is a NMOS transistor.

Pair 407 of capacitor-configured-transistors represents a second hold fixe having been applied to SDFQ 400. Pair 407 of capacitor-configured transistors affects hold-slack of SDFQ 400 by altering a data path of an output data signal at output node 464, e.g., by increasing the capacitance at output node 464. In some embodiments, assuming a data signal having a current state representing a logical value of one and a previous state representing a logical value of zero, as the data signal stabilizes into the current state at output node 464, the data signal first charges capacitor-configured-transistors P61 and N61 (P61 and N61 having been discharged by the previous state of the data signal). This charging takes a small amount of time, but nevertheless delays the stabilization of the data signal by an amount sufficient to affect the hold-slack of SDFQ 400 in a helpful manner. In some embodiments, assuming a data signal having a current state representing a logical value of zero and a previous state representing a logical value of one, as the data signal stabilizes into the current state at output node 464, the data signal first discharges capacitor-configured-transistors P61 and N61 (P61 and N61 having been charged by the previous state of the data signal). This discharging takes a small amount of time, but nevertheless delays the stabilization of the data signal by an amount sufficient to affect the hold-slack of SDFQ 400 in a helpful manner.

In FIG. 4A, scan buffer 403 receives a Scan/Test Enable (SE) signal that selects between normal operation relative to input signal D or a scan operation relative to a Scan-In (SI) signal. Scan buffer 403 is an inverter that includes series-connected transistors P41 and N41. Transistor P41 is connected between a node 480 having a first reference voltage, e.g., VDD, and a node 482. Transistor N41 is connected between node 482 and a node 484 having a second reference voltage, e.g., VSS. The gate terminals of each of transistors P41 and N41 are connected together and are configured to receive signal SE. Node 482 has a signal seb which is the inversion of signal SE.

In FIG. 4A, clock buffer 401 includes a pair of inverters. The first inverter includes series-connected transistors P31 and N31. Transistor P31 is connected between a node 468 having voltage VDD and a node 472. Transistor N31 is connected between node 472 and a node 476 having voltage VSS. The gate terminals of each of transistors P31 and N31 are connected together and are configured to receive a clock signal CP. Node 472 represents an output node of the first inverter and has a clock signal clkb which represents the inversion of signal CP. Each of signals SE and seb is routed to, and used by, multiplexer 402A.

The second inverter includes series-connected transistors P32 and N32. Transistor P32 is connected between a node 470 having voltage VDD and a node 474. Transistor N32 is connected between node 474 and a node 478 having voltage VSS. The gate terminals of each of transistors P32 and N32 are connected together and to node 472, and thus are configured to receive clock signal clkb. Node 474 represents an output node of the second inverter and has a clock signal clkbb which represents the inversion of signal clkb. Each of signals clkb and clkbb is routed to, and used by, each of multiplexer 402A and D flip-flop 404.

In FIG. 4A, multiplexer 402A includes transistors P11-P15 and N11-N15. Transistor P11 is connected between a node 408 having voltage VDD and a node 412. The gate terminal of transistor P11 receives signal SI. Transistor P12 is connected between node 412 and a node 416. The gate terminal of transistor P12 receives signal seb. Transistor P13 is connected between a node 410 having voltage VDD and a node 414. Gate terminal 406(1) of transistor P13 receives input signal D. Transistor P14 is connected between node 414 and node 416. The gate terminal of transistor P14 receives signal SE. Transistor P15 is connected between node 416 and a node 418 which has signal ml_ax. The gate terminal of transistor P15 receives signal clkbb. Transistor N11 is connected between node 418 and a node 420. The gate terminal of transistor N11 receives signal clkb. Transistor N12 is connected between node 420 and a node 422. The gate terminal of transistor N12 receives signal SE. Transistor N13 is connected between node 422 and a node 426 having voltage VSS. The gate terminal of transistor N13 receives signal SI. Transistor N14 is connected between node 420 and a node 424. The gate terminal of transistor N14 receives signal seb. Transistor N15 is connected between node 424 and a node 428 having voltage VSS. Gate terminal 406(2) of transistor N15 receives input signal D.

In FIG. 4A, D flip-flop 404 includes a first, second and third non-sleepy (NS) inverters, a transmission gate, and first and second sleepy inverters. The first NS inverter includes transistors P21 and N21. Transistor P21 is connected between a node 432 having voltage VDD and a node 434. Transistor N21 is located between node 434 and a node 436 having voltage VSS. The gate terminals of transistors P21 and N21 are connected together and to node 418, and thus are configured to receive signal ml_ax. As such, signal ml_ax represents the input signal of D flip-flop 404. Node 434 represents an output node of the first NS inverter and has a signal ml_b which represents the inversion of signal ml_ax.

In D flip-flop 404, the first sleepy inverter includes transistors P22-P23 and N22-N23. Transistor P22 is connected between a node 438 having voltage VDD and a node 440. Transistor P23 is connected between node 440 and node 418. The gate terminal of transistor P23 receives signal clkb. Transistor N22 is connected between node 418 and a node 442. The gate terminal of transistor N22 receives signal clkbb. Transistor N23 is connected between node 442 and a node 444 having voltage VSS. The gate terminal of transistor N22 receives signal clkbb. The first sleepy inverter can be put into a sleep mode due to transistors P23 and N22. The gate terminals of transistors P22 and N23 are connected together and to node 434. Accordingly, the first sleepy inverter feeds-back an inverted version of signal ml_b (from node 434) to node 418.

In FIG. 4A, the transmission gate includes transistors P24 and N24. Transistors P24 and N24 are connected in parallel between node 434 and a node 446. The gate of transistor P24 receives signal clkb. The gate terminal of transistor N24 receives signal clkbb. Node 446 has a signal sl_a.

In D flip-flop 404, the second NS inverter includes transistors P25 and N25. Transistor P25 is connected between a node 456 having voltage VDD and a node 458. Transistor N25 is connected between node 458 and a node 460 having voltage VSS. The gate terminals of transistors P25 and N25 are connected together and to node 446, and thus are configured to receive signal sl_a. Node 458 represents an output node of the second NS inverter and has a signal sl_bx which represents the inversion of signal sl_a.

In FIG. 4A, the second sleepy inverter includes transistors P26-P27 and N26-N27. Transistor P26 is connected between a node 448 having voltage VDD and a node 450. Transistor P27 is connected between node 450 and node 446. The gate terminal of transistor P27 receives signal clkbb. Transistor N26 is connected between node 446 and a node 452. Transistor N27 is connected between node 452 and a node 454 having voltage VSS. The gate terminal of transistor N26 receives signal clkb. The second sleepy inverter can be put into a sleep mode due to transistors P27 and N26. The gate terminals of transistors P22 and N23 are connected together and to node 458. Accordingly, the second sleepy inverter feeds-back an inverted version of signal sl_bx (from node 458) to node 446.

In D flip-flop 404, the third NS inverter includes transistors P28 and N28. Transistor P28 is connected between a node 462 having voltage VDD and a node 464. Transistor N28 is connected between node 464 and a node 466 having voltage VSS. The gate terminals of transistors P28 and N28 are connected together and to node 458, and thus are configured to receive signal sl_bx. Node 464 represents an output node of the third NS inverter, and thus of D flip-flop 404. Furthermore, node 464 also represents the output node of SDFQ 400. Node 464 has signal Q which represents the inversion of signal sl_bx.

Figure 4B:
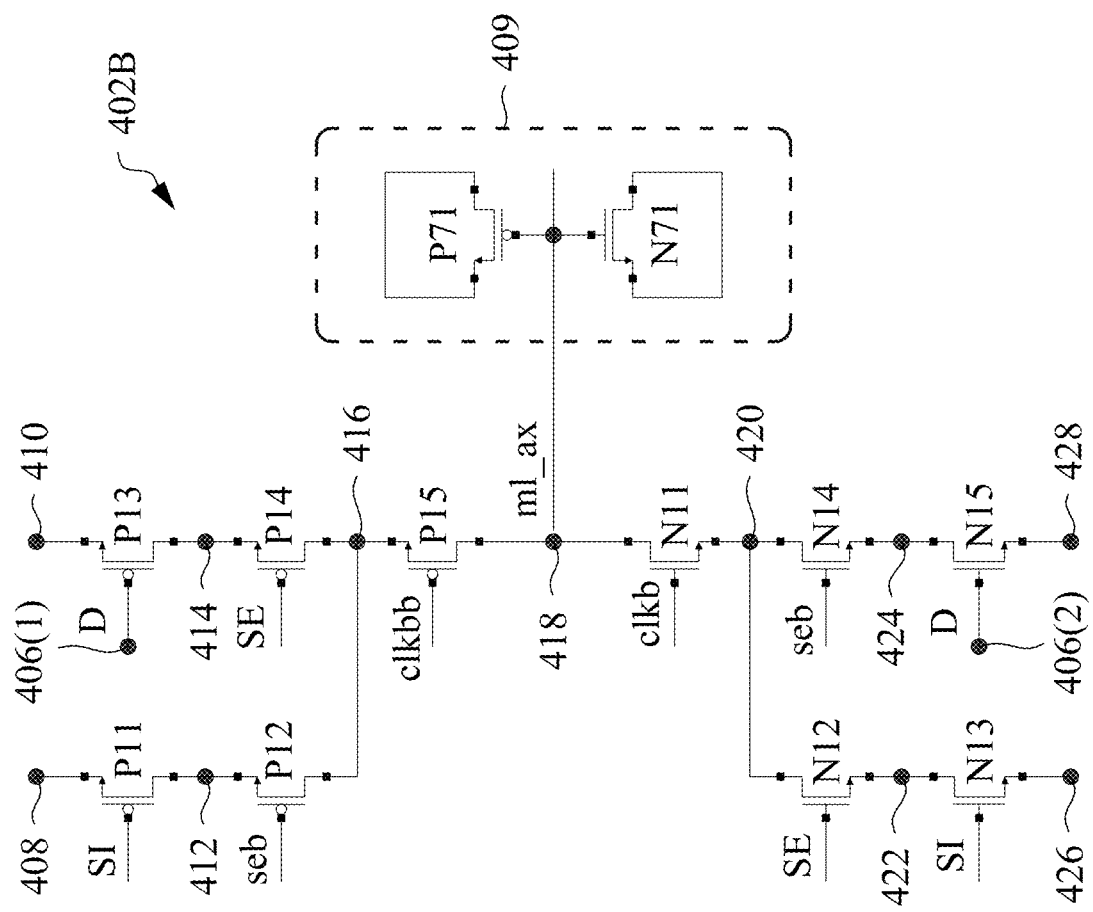

In FIG. 4B, multiplexer 402B is a first-alternate version of multiplexer 402A. As such, multiplexer 402B is included in a corresponding first-alternate version (not shown) of SDFQ 400. In particular, multiplexer 402B further includes a pair 409 of capacitor-configured-transistors P71 and N71. One capacitor-plate of each of capacitor-configured-transistors P71 and N71 is connected to node 418. More particularly, the gate terminal of each of capacitor-configured-transistors P71 and N71 is connected to node 418. Together, pair 409 of capacitor-configured-transistors P71 and N71 affect hold-slack of the first-alternate version of SDFQ 400 by altering a data path of signal ml_ax at input node 418, e.g., by increasing the capacitance at node 418. Though slight, this alteration of the data path nevertheless delays the stabilization of signal ml_ax by an amount sufficient to affect the hold-slack of the first-alternate version of SDFQ 400 in a helpful manner. The first-alternate version of SDFQ 400 is a result of having subjected a predecessor SDFQ (not shown) to intra-cell-repurposing according to the DD2CP method. More particularly, the inclusion of pair 409 of capacitor-configured-transistors P71 an N71 in the first-alternate version of SDFQ 400 is a result of having subjected the predecessor SDFQ (not shown) to intra-cell-repurposing according to the DD2CP method. In some embodiments, one of pair 405 or pair 407 is not included in the first-alternate version of SDFQ 400.

Figures 4C, 4D:
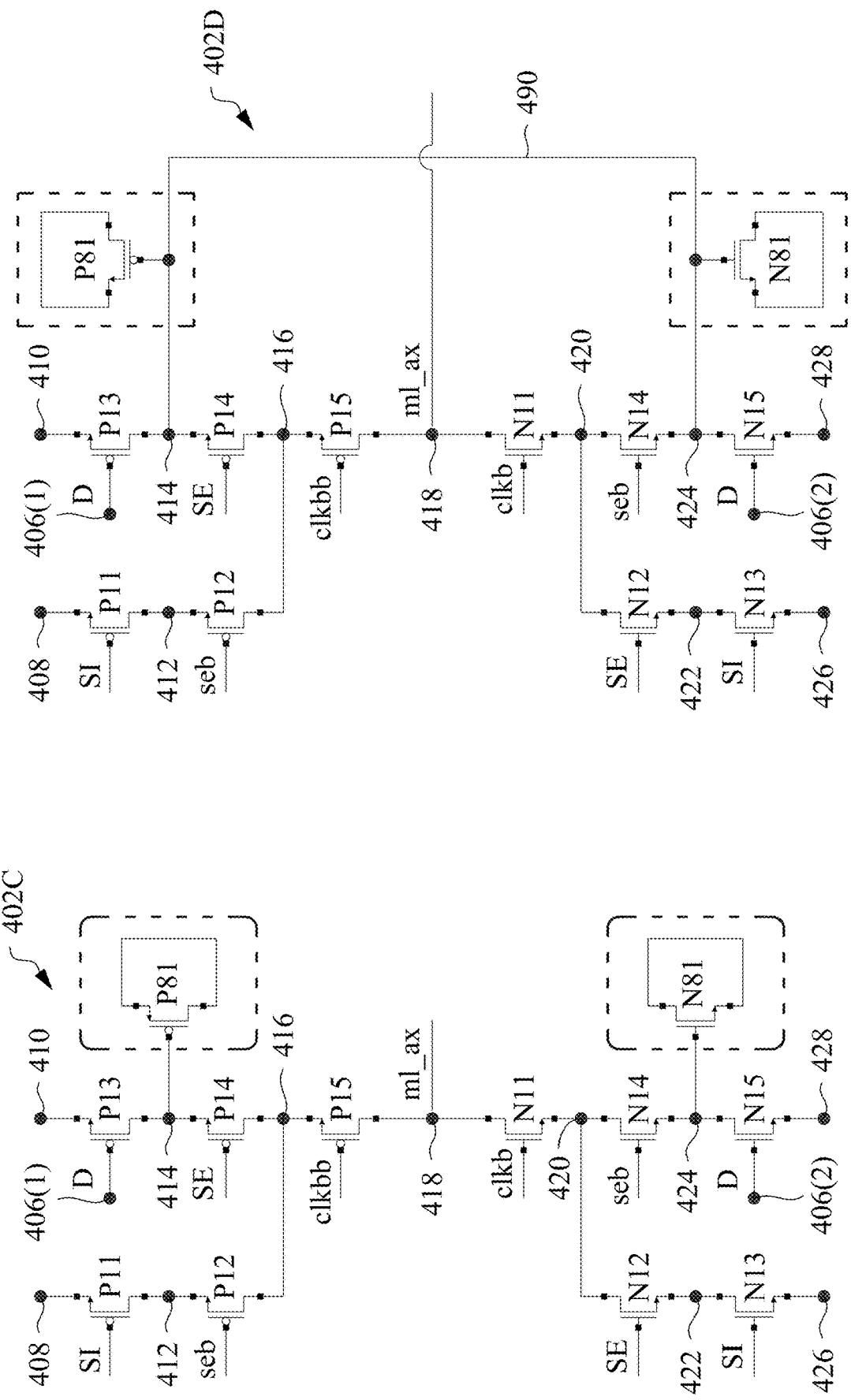

In FIG. 4C, multiplexer 402C is a second-alternate version of multiplexer 402A. As such, multiplexer 402C is included in a corresponding second-alternate version (not shown) of SDFQ 400. In particular, multiplexer 402C further includes capacitor-configured-transistors P81 and N81. One capacitor-plate of capacitor-configured-transistor P81 is connected to node 414. One capacitor-plate of capacitor-configured-transistor N81 is connected to node 424. More particularly, the gate terminals of capacitor-configured-transistors P81 and N81 are correspondingly connected to nodes 414 and 424. Capacitor-configured-transistors P81 and N81 correspondingly affect hold-slack of the second-alternate version of SDFQ 400 by altering the data paths that correspondingly include nodes 414 and 424, e.g., by increasing the corresponding capacitances at nodes 414 and 424. Though slight, these alterations of the corresponding data paths nevertheless delay the stabilization of the signals correspondingly on nodes 414 and 424 by corresponding amounts sufficient to affect the hold-slack of the second-alternate version of SDFQ 400 in a helpful manner. The second-alternate version of SDFQ 400 is a result of having subjected a predecessor SDFQ (not shown) to intra-cell-repurposing according to the DD2CP method. More particularly, the inclusion of capacitor-configured-transistors P81 an N81 in the second-alternate version of SDFQ 400 is a result of having subjected the predecessor SDFQ (not shown) to intra-cell-repurposing according to the DD2CP method. In some embodiments, one of pair 405 or pair 407 is not included in the second-alternate version of SDFQ 400. In some embodiments, pair 409 of multiplexer 402B of FIG. 4B is included in multiplexer 402C of FIG. 4C.

In FIG. 4D, multiplexer 402D is a version of multiplexer 402C, which also makes multiplexer 402D a third-alternate version of multiplexer 402A. As such, multiplexer 402D is included in a corresponding third-alternate version (not shown) of SDFQ 400. Multiplexer 402D differs from multiplexer 402C in that multiplexer 402D further includes a connection 490 between the gate terminals of corresponding capacitor-configured-transistors P81 and N81. As such, nodes 414 and 424 are connected together in multiplexer 402D whereas nodes 414 and 424 are disconnected in multiplexer 402C. In some embodiments, one of pair 405 or pair 407 is not included in the third-alternate version of SDFQ 400. In some embodiments, pair 409 of multiplexer 402B of FIG. 4B is included in multiplexer 402D of FIG. 4D.

Figure 4F:
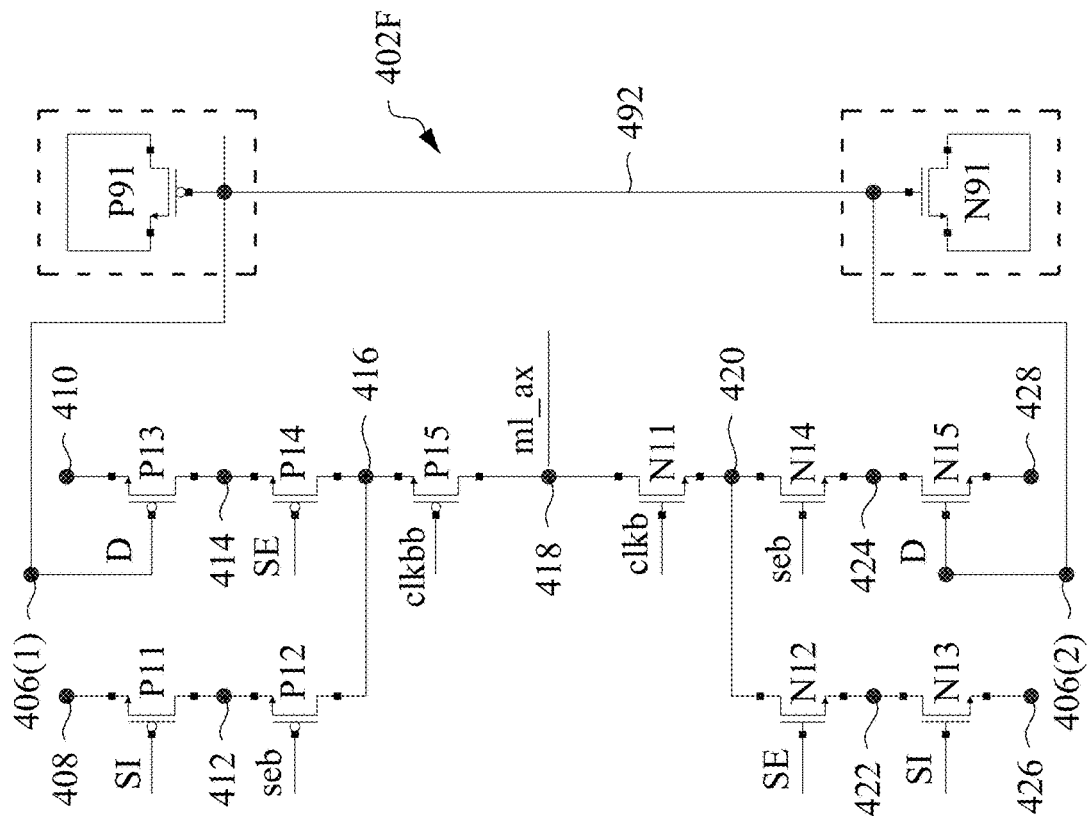
Figure 4E:
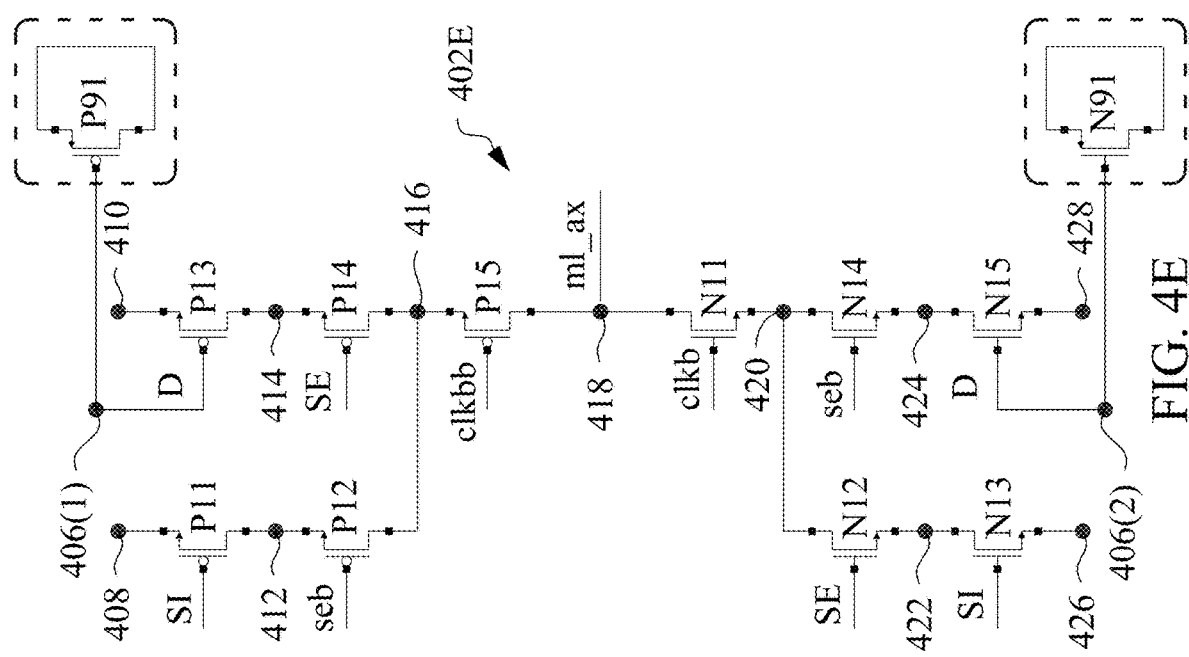

In FIG. 4E, multiplexer 402E is a fourth-alternate version of multiplexer 402A. As such, multiplexer 402E is included in a corresponding fourth-alternate version (not shown) of SDFQ 400. In particular, multiplexer 402E further includes capacitor-configured-transistors P91 and N91. One capacitor-plate of capacitor-configured-transistor P91 is connected to gate terminal 406(1) of transistor P13. One capacitor-plate of capacitor-configured-transistor N81 is connected to gate terminal 406(2) of transistor N15. More particularly, the gate terminals of capacitor-configured-transistors P91 and N91 are correspondingly connected to gate terminals 406(1) and 406(2) of corresponding transistors P13 and N15. Capacitor-configured-transistors P91 and N91 correspondingly affect hold-slack of the fourth-alternate version of SDFQ 400 by altering the data paths that correspondingly include gate terminals 406(1) and 406(2) of corresponding transistors P13 and N15, e.g., by increasing the capacitances at gate terminals 406(1) and 406(2) of corresponding transistors P13 and N15. Though slight, these alterations of the corresponding data paths nevertheless delay the stabilization of the signals correspondingly on gate terminals 406(1) and 406(2) of corresponding transistors P13 and N15 by corresponding amounts sufficient to affect the hold-slack of the fourth-alternate version of SDFQ 400 in a helpful manner. The fourth-alternate version of SDFQ 400 is a result of having subjected a predecessor SDFQ (not shown) to intra-cell-repurposing according to the DD2CP method. More particularly, the inclusion of capacitor-configured-transistors P91 an N91 in the fourth-alternate version of SDFQ 400 is a result of having subjected the predecessor SDFQ (not shown) to intra-cell-repurposing according to the DD2CP method. In some embodiments, one of pair 405 or pair 407 is not included in the fourth-alternate version of SDFQ 400. In some embodiments, pair 409 of multiplexer 402B of FIG. 4B is included in multiplexer 402E of FIG. 4E.

In FIG. 4F, multiplexer 402F is a version of multiplexer 402E, which also makes multiplexer 402F a fifth-alternate version of multiplexer 402A. As such, multiplexer 402F is included in a corresponding fifth-alternate version (not shown) of SDFQ 400. Multiplexer 402F differs from multiplexer 402E in that multiplexer 402F further includes a connection 492 between the gate terminals of corresponding capacitor-configured-transistors P91 and N91. As such, gate terminals 406(1) and 406(2) of corresponding transistors P13 and N15 are connected together in multiplexer 402F whereas gate terminals 406(1) and 406(2) of corresponding transistors P13 and N15 are disconnected in multiplexer 402C. In some embodiments, one of pair 405 or pair 407 is not included in the fifth-alternate version of SDFQ 400. In some embodiments, pair 409 of multiplexer 402B of FIG. 4B is included in multiplexer 402F of FIG. 4F.

FIGS. 5A, 5B, 5C, 5D, 5E, and 5F are layout diagrams of corresponding cells 500A, 500B, 500C, 500D, 500E and 500F representing corresponding cell regions in a semiconductor device, in accordance with some embodiments. FIG. 5G is a cross-section, in accordance with some embodiments.

Cells 500A-500F relate to FIGS. 4A-4F as follows. Cell 500A of FIG. 5A, which assumes a planar-transistor architecture, is a representation of the second-alternate version (not shown) of SDFQ 400 corresponding to multiplexer 402C of FIG. 4C. Cell 500B of FIG. 5B, which assumes a fin-FET architecture, is a representation of the third-alternate version (not shown) of SDFQ 400 corresponding to multiplexer 402D of FIG. 4D. Cell 500C of FIG. 5C, which assumes a planar-transistor architecture, is a representation of the second-alternate version (not shown) of SDFQ 400 corresponding to multiplexer 402B of FIG. 4B. Cell 500D of FIG. 5D, which assumes a fin-FET architecture, is a representation of the second-alternate version (not shown) of SDFQ 400 corresponding to multiplexer 402B of FIG. 4B. Cell 500E of FIG. 5E, which assumes a planar-transistor architecture, is a representation of the fourth-alternate version (not shown) of SDFQ 400 corresponding to multiplexer 402E of FIG. 4E. Cell 500F of FIG. 5F, which assumes a fin-FET architecture, is a representation of the fifth-alternate version (not shown) of SDFQ 400 corresponding to multiplexer 402F of FIG. 4F.

Cell region 102 of semiconductor device 100 is an example of a cell region in a semiconductor device resulting from a larger layout diagram that correspondingly includes cell 500A, 500B, 500C, 500D, 500E and 500F. Each of cells 500A, 500B, 500C, 500D, 500E or 500F includes cell boundaries 503(1), 503(2), 503(3) and 503(4), which correspond to cell boundaries 103(1), 103(2), 103(3), and 103(4) of cell region 102 of semiconductor device 100. For simplicity of discussion, repeated reference numerals are left out of FIGS. 5A, 5B, 5C, 5D, 5E, and 5F. Differences between FIGS. 5A, 5B, 5C, 5D, 5E, and 5F are called out; and a change in element is called out with a different reference number.

Figure 5A:
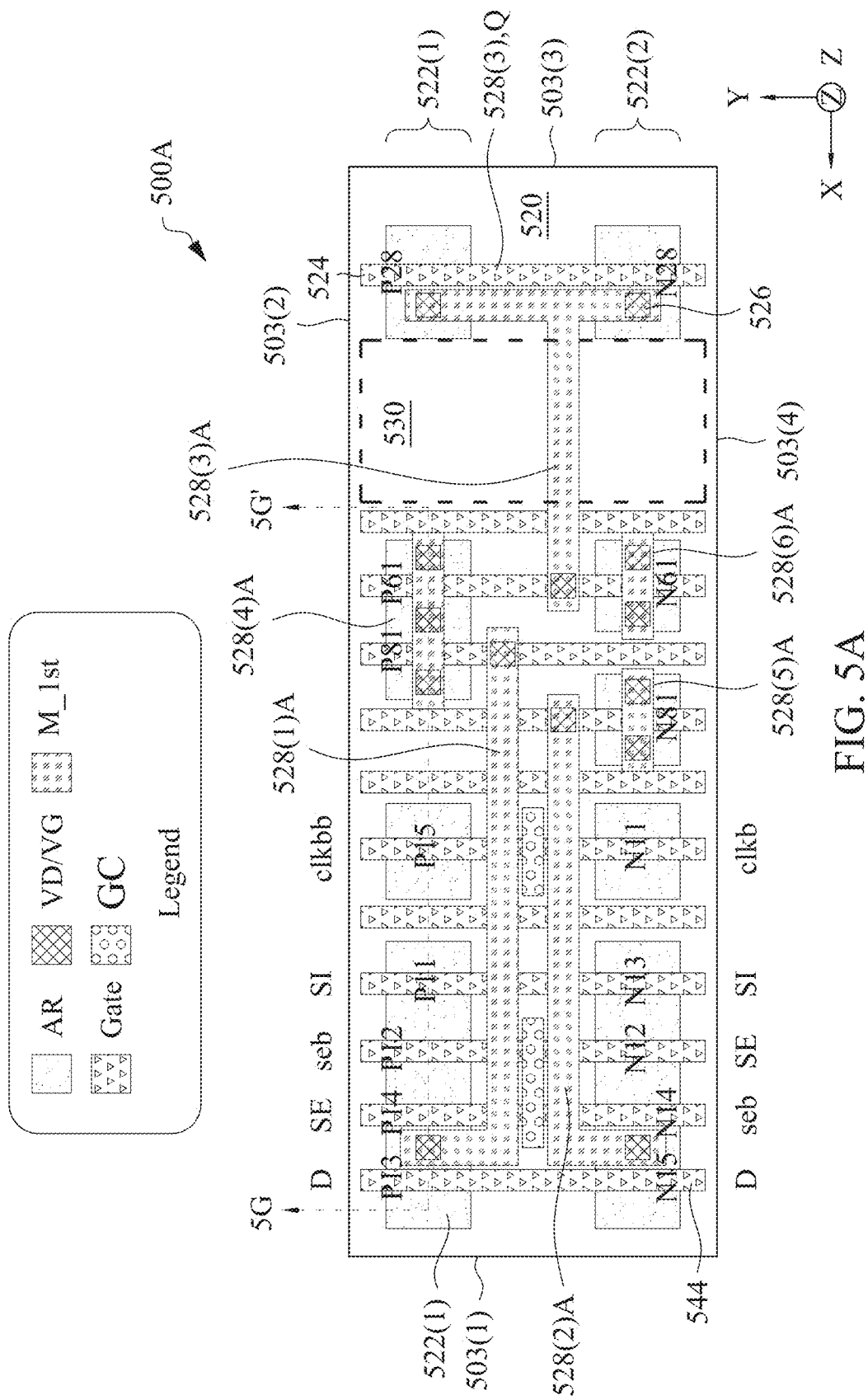
FIGS. 5A, 5B, 5C, 5D, 5E, and 5F are corresponding layout diagrams of a semiconductor device, in accordance with some embodiments.
Figure 5B:
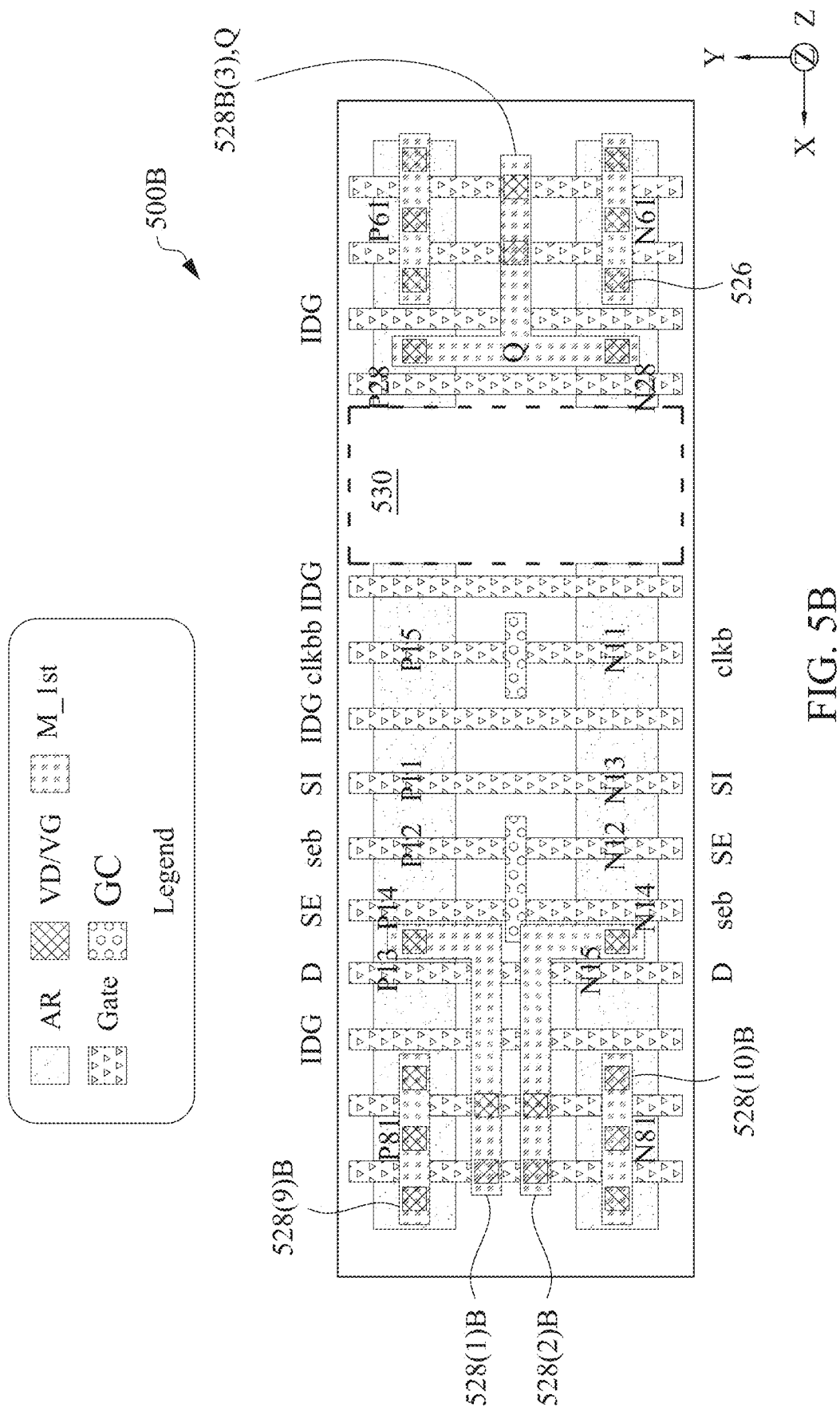
Figure 5C:
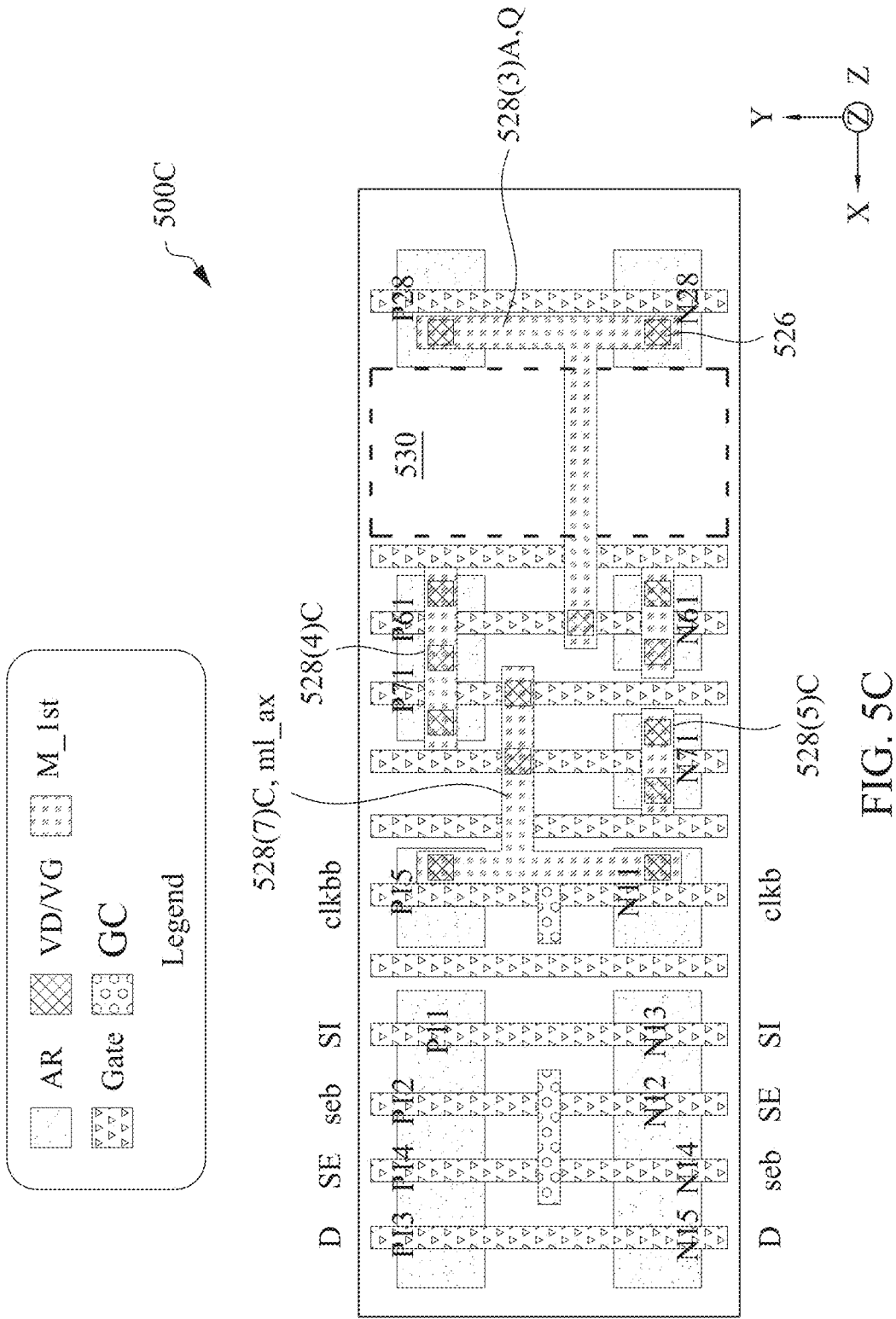
Figure 5D:
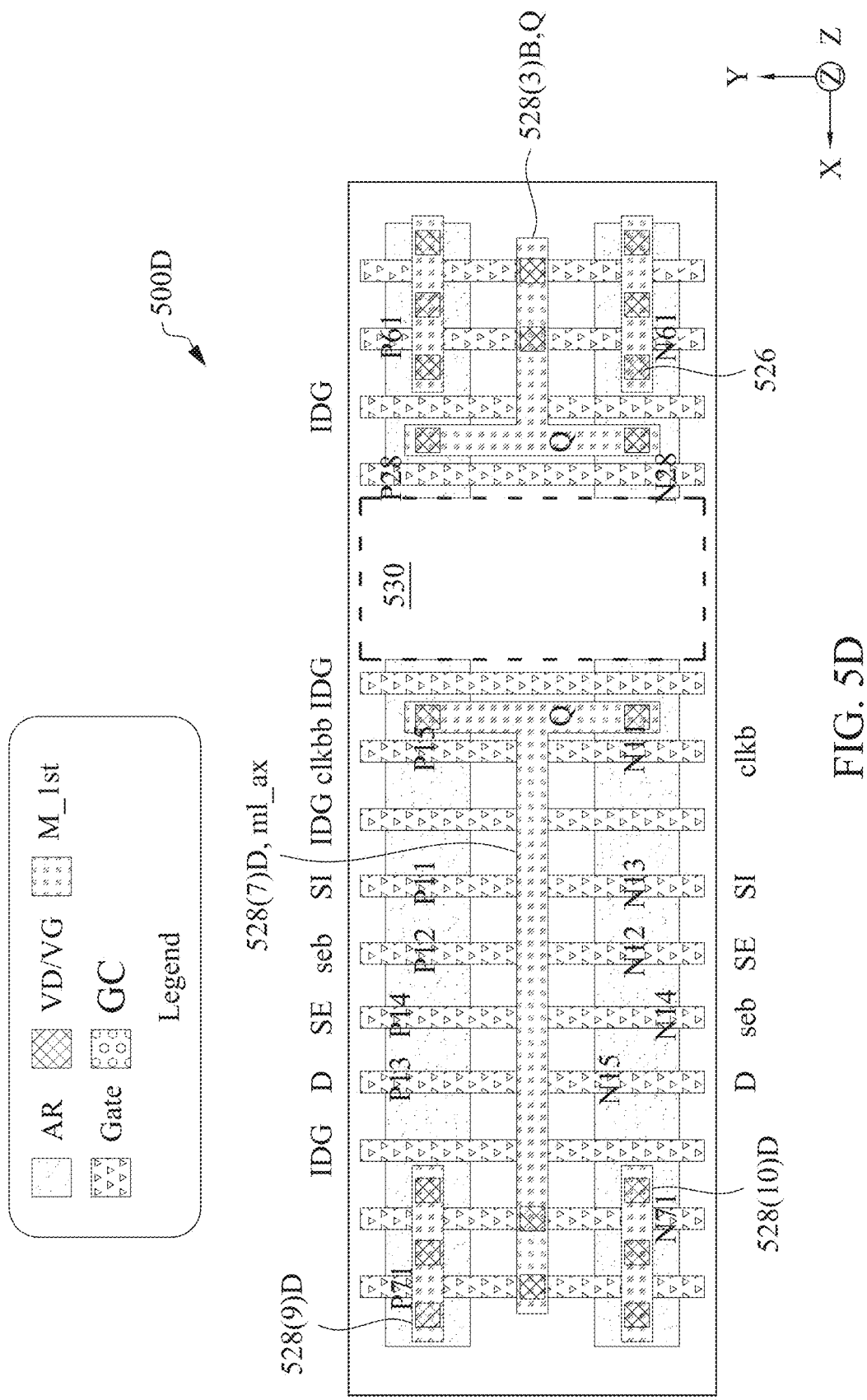
Figure 5E:
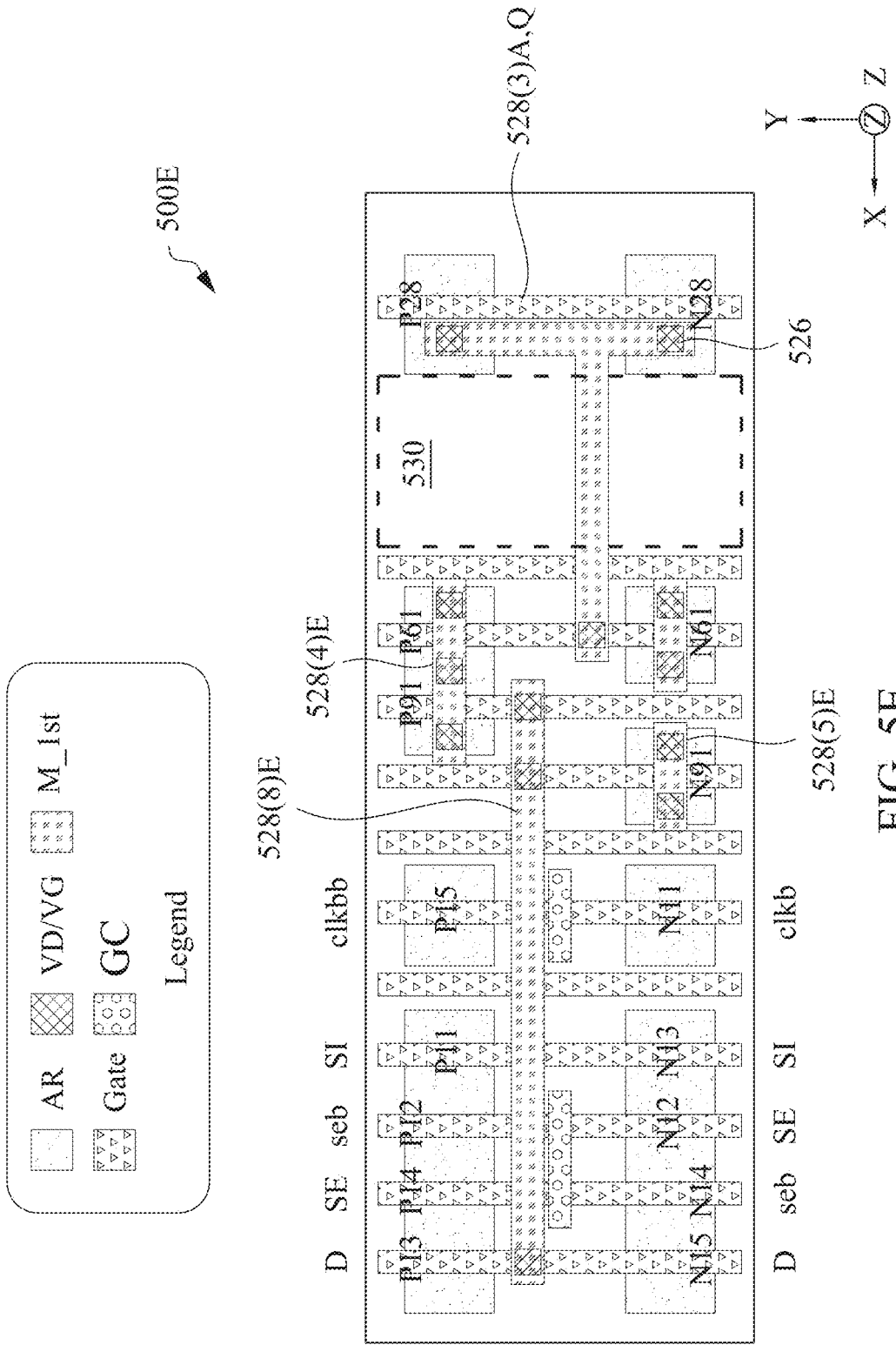

Cells 500A, 500C and 500E of corresponding FIGS. 5A, 5C and 5E assume a corresponding planar transistor architecture. Cells 500B, 500D and 500F of corresponding FIGS. 5B, 5D and 5F assume a corresponding fin-FET architecture. Each of Each of cells 500A, 500B, 500C, 500D, 500E or 500F includes a substrate region 520 is in a first layer or a substrate layer, or in a sub-layer of the transistor layer, or the like.

In general, a layout diagram represents a three-dimensional semiconductor device. Shapes in the layout diagram represent corresponding components in the semiconductor device. The layout diagram per se is a top view. Shapes in the layout diagram are two-dimensional. Each shape in the layout diagram represents, more particularly, a component in a corresponding layer of the corresponding semiconductor device. Typically, the layout diagram represents relative depth by superimposing a second shape on a first shape so that the second shape at least partially overlaps the first shape.

In a context of a more formal nomenclature, elements in SDFQ 400 of FIG. 4A, or the first to fifth alternate versions (not shown) of SDFQ 400 corresponding to FIGS. 4B-4F, or the like, are represented by corresponding patterns (also known as shapes) in the corresponding layout diagrams of FIGS. 5A-5F. For simplicity of discussion, i.e., as a discussion-expedient, some elements in the layout diagrams of FIGS. 5A-5F are referred to as if they are counterpart structures in FIGS. 4A-4F rather than patterns/shapes per se.

In FIG. 5A, active region (AR) patterns 522(1) and 522(2) extend parallel to the X-axis and have a width relative to the X-axis. AR patterns 522(1) and 522(2) are in a second layer or in an AR layer, or in a sub-layer of the transistor layer, or the like. AR pattern 522(2) represent an n-type ARs and AR pattern 522(1) represent a p-type ARs. Gate patterns 544 extend parallel to the Y-axis and have a width in the X-axis. Gate patterns 544 are in a third layer or a gate layer, or an MD sub-layer in the transistor layer, or the like. Contact patterns 526 or VD/VG patterns are in a fourth layer or a VD/VG sub-layer in the transistor layer, or the like. Conductive segments 528(1)A, 528(2)A, and 528(3)A are M_1st segments which correspond to conductors included in a first (1st) layer of metallization (M_1st layer) in a semiconductor device based on corresponding larger layout diagram which includes SDFQ 500A. In some embodiments, depending upon the numbering convention of the corresponding process node by which such a semiconductor device is fabricated, the M_1st layer is either metallization layer zero, M0, or metallization layer one, M1. Break 530 represents patterns which has been omitted for simplicity of illustration and discussion.

_In SDFQ 500A, the gate patterns otherwise common to transistors P14 & N15, P12 & N12 and P15 & N11 are designated to be cut/split by corresponding cut-gate (CG) patterns. The gate pattern of transistors P13 and N15 receive signal D. The gate pattern of transistor P14 receives signal SE. The gate pattern of transistor N14 receives signal seb. The gate pattern of transistor P12 receives signal seb. The gate pattern of transistor N12 receives signal SE. The gate pattern of transistors P11 and N13 receive signal SI. The gate pattern of transistor P15 receives signal clkbb. The gate pattern of transistor N11 receives signal clkb.

In FIG. 5A, M_1st segment 528(1)A connects an S/D region shared by transistors P13 and P14 to the gate pattern of transistor P81 through corresponding VGD patterns 526 and (relative to the S/D region) an MD contact pattern (not shown). M_1st segment 528(2)A connects an S/D region shared by transistors N15 and N14 to the gate pattern of transistor N81 through corresponding VGD patterns 526 and (relative to the S/D region) an MD contact pattern (not shown). M_1st segment 528(3)A connects an S/D region of transistor P28 to an S/D region of transistor N28 and to the gate pattern of each of transistors P61 and N61 through corresponding VGD patterns 526 and (relative to the S/D regions) corresponding MD contact patterns (not shown). M_1st segment 528A(3) is designated to have signal Q.

In SDFQ 500A, M_1st segment 528(4)A connects first & second S/D regions of transistor P81 and first & second S/D regions of transistor P61 through corresponding VGD patterns 526 and MD contact patterns (not shown), wherein the second S/D region of transistor P81 is the same as the first S/D region of transistor P61. M_1st segment 528(5)A connects first & second S/D regions of transistor N81 through corresponding VGD patterns 526 and MD contact patterns (not shown). M_1st segment 528(6)A connects first & second S/D regions of transistor N61 through corresponding VGD patterns 526 and MD contact patterns (not shown).

Cell region 500G of FIG. 5G corresponds to cell 500A of FIG. 5A. In particular, cell region 500G of FIG. 5G corresponds to section line 5G-5G' shown in FIG. 5A. In FIG. 5G, AR 522(1) is shown as broken into three portions, 522(1)(1), 522(1)(2) and 522(1)(3). Relative to FIG. 5A, FIG. 5G further includes metal-to-source/drain (MD) contact structures 525. Among other things, FIG. 5G shows capacitor-configured-transistors P61 and P81.

In FIG. 5B, the gate patterns otherwise common to transistors P14 & N15, P12 & N12 and P15 & N11 are designated to be cut/split by corresponding cut-gate (CG)

patterns. The gate pattern of transistors P13 and N13 receive signal D. The gate pattern of transistor P14 receives signal SE. The gate pattern of transistor N14 receives signal seb. The gate pattern of transistor P12 receives signal seb. The gate pattern of transistor N12 receives signal SE. The gate pattern of transistors P11 and N13 receive signal SI. The gate pattern of transistor P15 receives signal clkbb. The gate pattern of transistor N11 receives signal clkb. M_1st segment 528(1)B connects an S/D region shared by transistors P13 and P14 to the gate patterns of transistors P81 and N91 through corresponding VGD patterns 526 and (with respect to the S/D regions) MD contact patterns (not shown).

In SDFQ 500B, M_1st segment 528(2)B connects an S/D region shared by transistors N15 and N14 to the gate patterns of each of transistors P81 and N81 through corresponding VGD patterns 526 and (relative to the S/D region) an MD contact pattern (not shown). M_1st segment 528B(3) connects an S/D region of transistor P28 to an S/D region of transistor N28 and to the gate patterns of each of transistors P61 and N61 through corresponding VGD patterns 526 and (relative to the S/D regions) MD contact patterns (not shown). M_1st segment 528B(3) is designated to have signal Q. The gate pattern between (A) the gate patterns of transistors P13 & N15 and (B) the gate patterns of transistors P81 & N81 is designated to become an isolation dummy gate (IDG).

In FIG. 5B, M_1st segment 528(9)B connects first & second & third S/D regions of transistor P81 through corresponding VGD patterns 526 and MD contact patterns (not shown). M_1st segment 528(10)B connects first & second & third S/D regions of transistor N81 through corresponding VGD patterns 526 and MD contact patterns (not shown).

In SDFQ 500B, the gate pattern between (A) the gate pattern of transistors P15 & N11 and (B) break 530 is designated to become an isolation dummy gate (IDG). The gate pattern between (A) the gate pattern of transistors P11 & N13 and (B) the gate pattern of transistors P15 & N11 is designated to become an isolation dummy gate (IDG).

In some embodiments, an isolation dummy gate is a dielectric structure that includes one or more dielectric materials and functions as an electrical isolation structure. Accordingly, an isolation dummy gate is not a structure that is electrically conductive and thus does not function, e.g., as an active gate of a transistor. An isolation dummy gate includes one or more dielectric materials and functions as an electrical isolation structure. In some embodiments, an isolation dummy gate is based on a gate structure as a precursor. In some embodiments, a dummy gate structure includes a gate conductor, a gate-insulator layer, (optionally) one or more spacers, or the like. In some embodiments, an isolation dummy gate is formed by first forming a gate structure, e.g., a dummy gate structure, sacrificing/removing (e.g., etching) the gate conductor of the gate structure to form a trench, (optionally) removing a portion of a substrate that previously had been under the gate conductor to deepen the trench, and then filling the trench with one or more dielectric materials such that the physical dimensions of the resultant electrical isolation structure, i.e., the isolation dummy gate, are similar to the dimensions of the dummy gate conductor which was sacrificed, namely the gate conductor or the combination of the gate conductor and the portion of the substrate. In some embodiments, an isolation dummy gate is a dielectric feature that includes one or more dielectric materials (e.g., oxide, nitride, oxynitride, or other suitable materials), and functions as an isolation feature. In some embodiments, an isolation dummy gate is a continuous polysilicon on oxide diffusion (OD) edge structure, and is referred to as a CPODE structure.

Regarding FIG. 5C, differences with respect to FIG. 5A are noted. M_1st segment 528(4)C connects first & second S/D regions of transistor P71 and first & second S/D regions of transistor P61 through corresponding VGD patterns 526 and MD contact patterns (not shown), wherein the second S/D region of transistor P71 is the same as the first S/D region of transistor P61. M_1st segment 528(5)C connects first & second S/D regions of transistor N71 through corresponding VGD patterns 526 and MD contact patterns (not shown). FIG. 5C further includes M_1st segment 528(7)C but omits M_1st segments 528(1)A and 528(2)A of FIG. 5A. M_1st segment 528(7)C connects an S/D region of transistor P15 to an S/D region of transistor N11 and to the gate pattern of transistor N71 and to the gate pattern transistor P71 through corresponding VGD patterns 526 and (relative to the S/D regions) MD contact patterns (not shown). M_1st segment 528(7)C is designated to have signal ml_ax.

Regarding FIG. 5D, differences with respect to FIG. 5B are noted. In FIG. 5D, SDFQ 500D further includes M_1st segment 528(7)D but omits M_1st segments 528(1)B and 528(2)B of FIG. 5B. M_1st segment 528(7)D connects the gate patterns of each of transistors P71 and N71 to an S/D region of transistor P15 and to an S/D region of transistor N11 through corresponding VGD patterns 526 and (with respect to the S/D regions) MD contact patterns (not shown). The gate pattern between (A) the gate patterns of transistors P13 & N15 and (B) the gate patterns of transistors P71 & N71 is designated to become an isolation dummy gate (IDG). In FIG. 5D, M_1st segment 528(9)D connects first & second & third S/D regions of transistor P71 through corresponding VGD patterns 526 and MD contact patterns (not shown). M_1st segment 528(10)D connects first & second & third S/D regions of transistor N71 through corresponding VGD patterns 526 and MD contact patterns (not shown).

Regarding FIG. 5E, differences with respect to FIG. 5C are noted. M_1st segment 528(4)E connects first & second S/D regions of transistor P91 and first & second S/D regions of transistor P61 through corresponding VGD patterns 526 and MD contact patterns (not shown), wherein the second S/D region of transistor P91 is the same as the first S/D region of transistor P61. M_1st segment 528(5)E connects first & second S/D regions of transistor N91 through corresponding VGD patterns 526 and MD contact patterns (not shown). FIG. 5E further includes M_1st segment 528(8)E but omits M_1st segment 528(7)C of FIG. 5C. M_1st segment 528(8)E connects the gate pattern of transistors P13 & N15 to the gate pattern of transistor N91 and to the gate pattern of transistor P91 through corresponding VGD patterns 526 and (relative to the S/D regions) corresponding MD contact patterns (not shown).

Figure 5F:
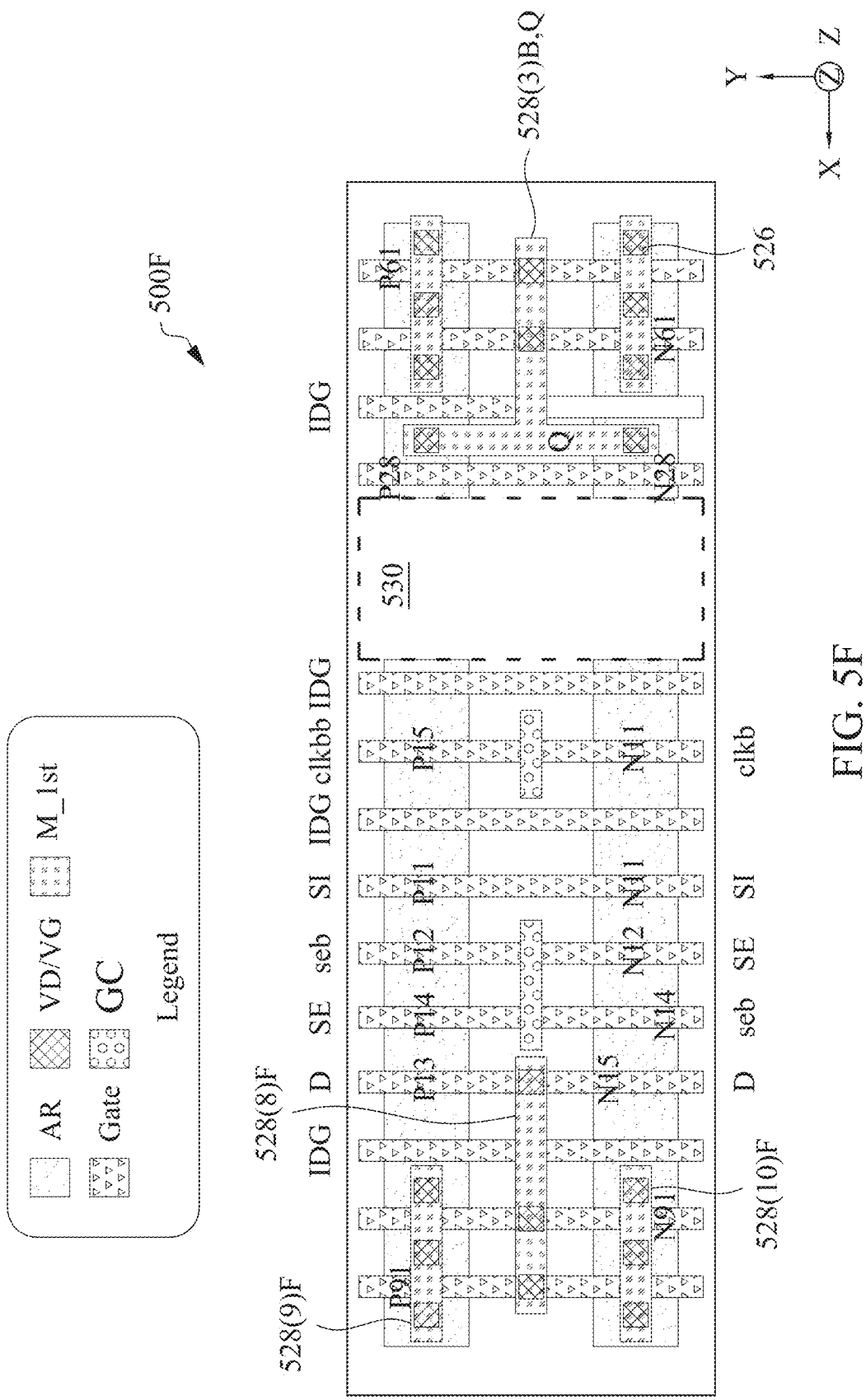
Figure 5G:
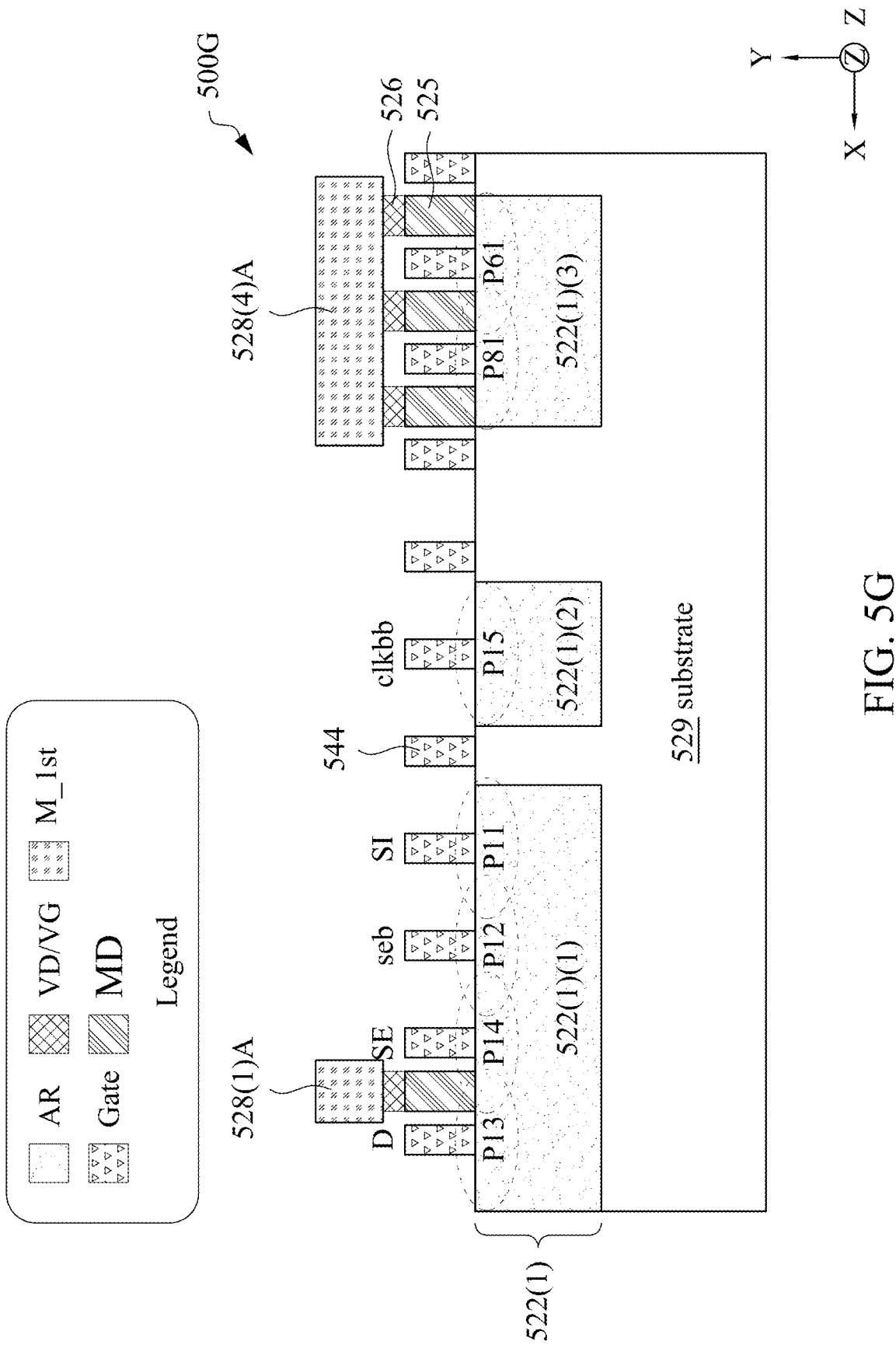
FIG. 5G is a cross-section, in accordance with some embodiments.

Regarding FIG. 5F, differences with respect to FIG. 5D are noted. In FIG. 5F, SDFQ 500F further includes M_1st segment 528(8)F but omits M_1st segment 528(7)D of FIG. 5D. M_1st segment 528(8)F connects the gate patterns of each of transistors P91 and N91 to the gate electrode of each of transistors P13 and N15 through corresponding VGD patterns 526. In FIG. 5F, M_1st segment 528(9)F connects first & second & third S/D regions of transistor P91 through corresponding VGD patterns 526 and MD contact patterns (not shown). M_1st segment 528(10)F connects first & second & third S/D regions of transistor N91 through corresponding VGD patterns 526 and MD contact patterns (not shown).

Figure 6A:
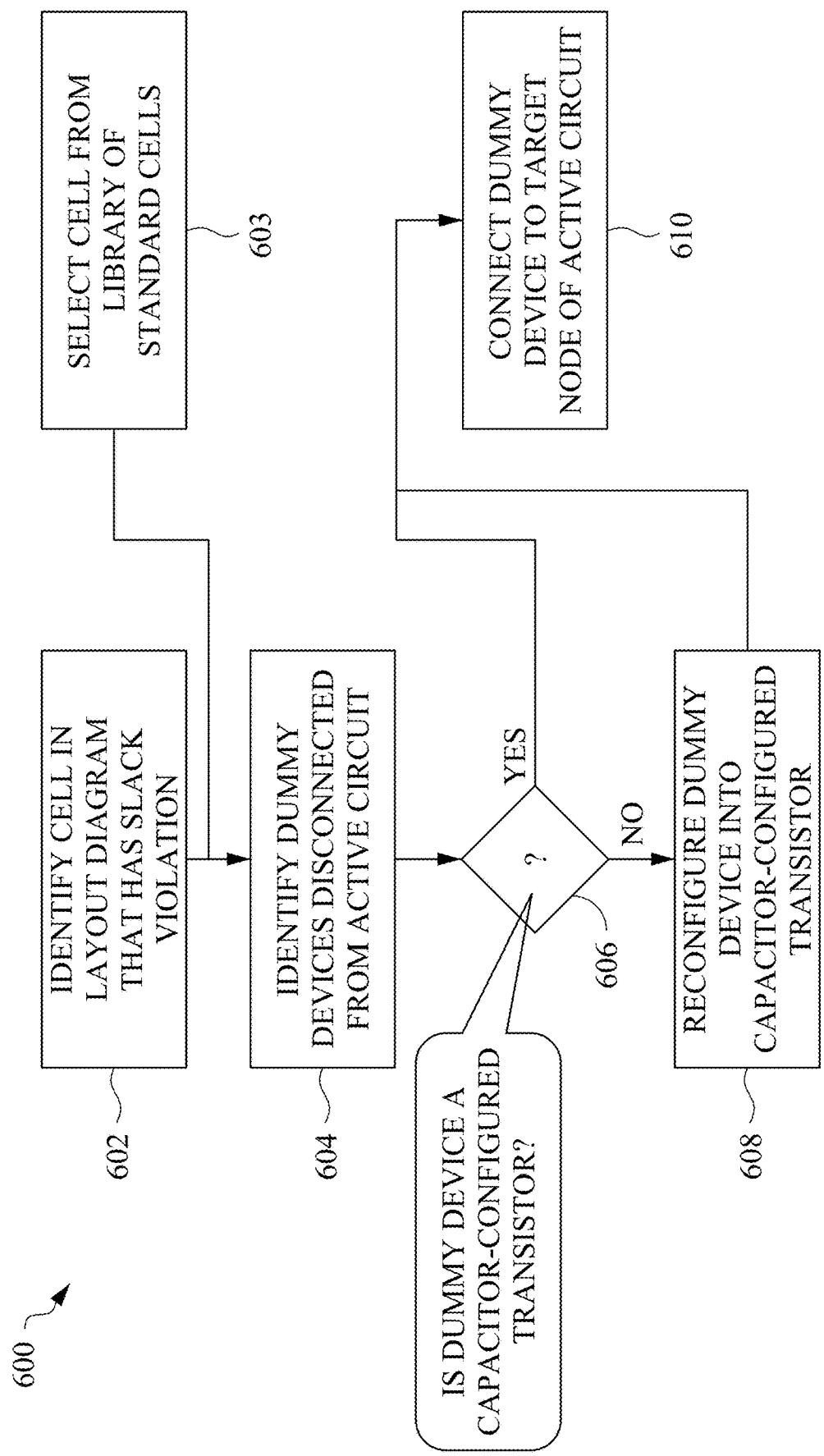
FIG. 6A is a flowchart of a method of generating a layout diagram, in accordance with some embodiments.

FIG. 6A is a flowchart of a method 600 of generating a layout diagram, in accordance with some embodiments.

Method 600 includes blocks 602-610. At a block 602 of FIG. 6, a cell in a layout diagram that has a slack violation is identified. An example of a cell having a slack violation is cell 212A in FIG. 2A, or the like. From block 602, flow proceeds to block 604.

Alternatively, flow in FIG. 6A starts at block 603. At block 603, a cell is selected from a library of standard cells. An example of the cell is cell 212A in FIG. 2A, or the like. An example of the standard library of cells is standard cell library 820 of FIG. 8, or the like. From block 603, flow proceeds to block 604.

At block 604, dummy devices are identified which are within the cell and which are disconnected from an active circuit defined by the cell. Examples of dummy devices disconnected from an active circuit include the dummy transistors represented by dummy PMOS regions 204(1)-204(2) dummy NMOS regions 206(1)-206(2) in FIG. 2A, or the like. From block 604, flow proceeds to block 606.

Blocks 606-610 are performed iteratively for each of the identified dummy devices. At block 606, which is a decision block, a determination is made as to whether the dummy device is configured as capacitor-configured-transistors. An example of a dummy device having a capacitor-configuration is capacitor-configured-transistor 300A in FIG. 3A. In response to a dummy device not being a capacitor-configured-transistor ("NO" branch of block 606), flow proceeds to block 608. In response to a dummy device being configured as a capacitor-configured-transistor ("YES" branch of block 606), flow proceeds to block 610.

At block 608, the dummy device having a non-capacitor-configuration is reconfigured into a capacitor-configuration. An example of a dummy device having a non-capacitor-configuration is dummy device having a shorted configuration, e.g., shorted-transistor 300B in FIG. 3B, or the like. An example of having converted a shorted-transistor into a capacitor-configured transistor is discussed in the context of FIG. 2B. From block 608, flow proceeds to a block 610.

At block 610, the dummy device is connected to a target node(s) of the active circuit and thereby intra-cell-repurposed. As such, block 610 is an example of the DD2CP method. Examples of dummy devices being connected to a target node include the connection of the gate terminals of capacitor-configured-transistors P71 and N71 being connected to node 418 of FIG. 4B, the connections of the gate terminals of capacitor-configured-transistors P81 and N81 being connected to corresponding nodes 414 and 424 of FIG. 4C, or the like.

Figure 6B:
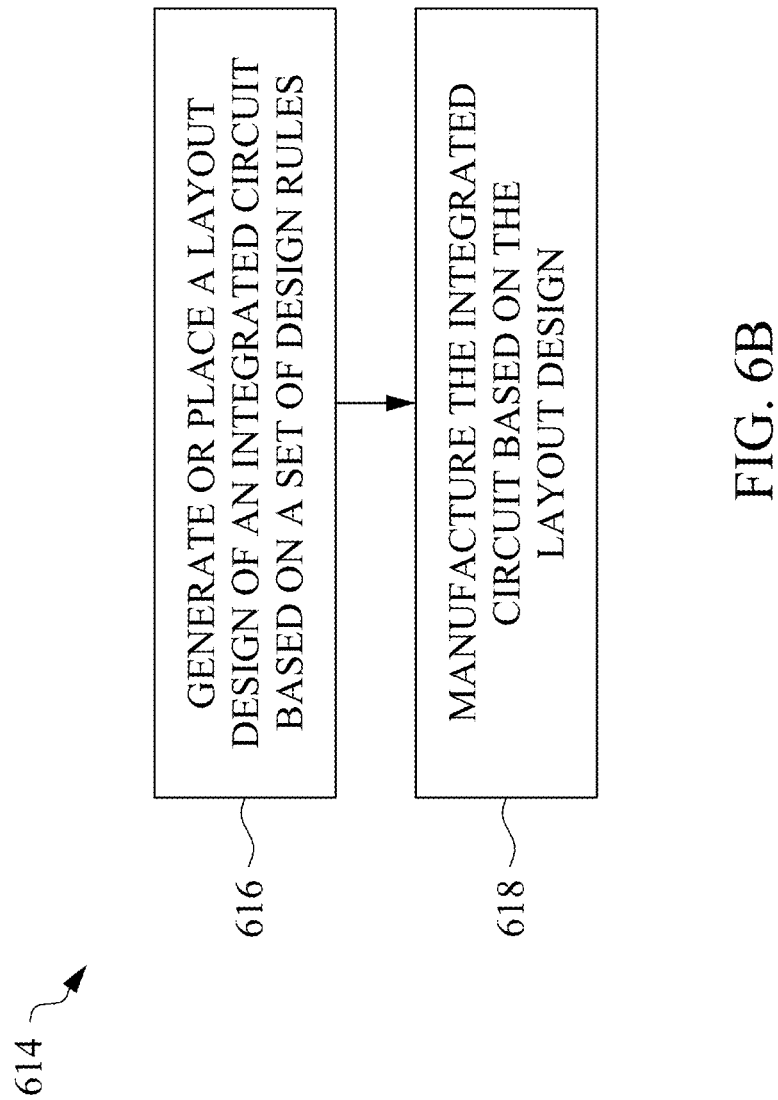
FIG. 6B is a flowchart of a method of manufacturing a semiconductor device, in accordance with some embodiments.

FIG. 6B is a flowchart of a method 614 of manufacturing a semiconductor device, in accordance with some embodiments.

Method 614 is implementable, for example, using EDA system 800 (FIG. 8, discussed below) and an integrated circuit (IC) manufacturing system 900 (FIG. 9, discussed below), in accordance with some embodiments. Examples of a semiconductor device which can be manufactured according to method 614 include semiconductor devices 212A, 212B, 212C, 400, 402B, 402C, 402D, 402E, and 402F of corresponding FIGS. 2A, 2B, 2C, 4A, 4B, 4C, 4D, 4E, and 4F, semiconductor devices corresponding to various ones of the layout diagrams disclosed herein, or the like.

In FIG. 6B, method 614 includes blocks 616-618. At block 616, a layout diagram is generated which, among other things, includes one or more of layout diagrams disclosed herein, e.g., a layout diagram resulting from method 600 of FIG. 6A, layout diagrams corresponding to semiconductor devices 212A, 212B, 212C, 400, 402B, 402C, 402D, 402E and 402F of corresponding FIGS. 2A, 2B, 2C, 4A, 4B, 4C, 4D, 4E, and 4F, or the like. Block 616 is implementable, for example, using EDA system 1800 (FIG. 18, discussed below), in accordance with some embodiments.

More particularly, block 616 includes generating shapes corresponding to structures in a semiconductor diagram which are to be represented. For example: where the layout diagram being generated corresponds to cell region 212A, block 616 includes generating shapes corresponding to structures which would be included in in cell region 212A. From block 616, flow proceeds to block 618.

At block 618, based on the layout diagram, at least one of (A) one or more photolithographic exposures are made or (B) one or more semiconductor masks are fabricated or (C) one or more components in a layer of a semiconductor device are fabricated. See discussion below of IC manufacturing system 900 in FIG. 9 below.

Figure 7:
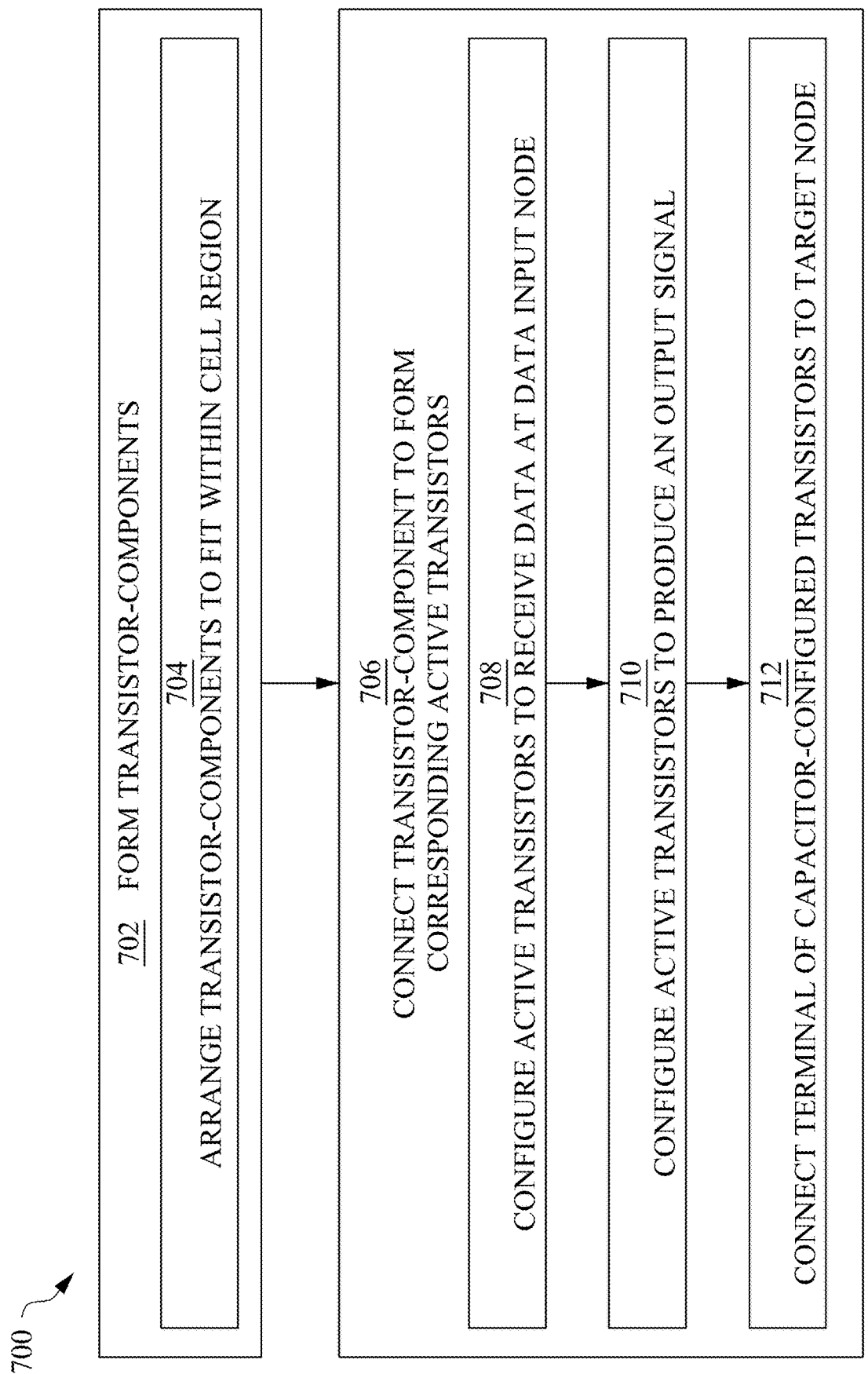
FIG. 7 is a flowchart of a method of manufacturing a semiconductor device, in accordance with some embodiments.

FIG. 7 is a flowchart of a method 700 of manufacturing an semiconductor device, in accordance with some embodiments.

Method 700 includes blocks 702-712. At block 702, transistor-components are formed. Examples of transistor-components include gate structures, active regions that include one or more source/drain (S/D) regions, or the like. Examples of patterns in layout diagrams the correspond to such transistor-components include gate patterns 544, ARs 522(1) and ARs 522(2) in FIG. 5A, or the like. In some embodiments, forming the transistor-components includes: forming a substrate (e.g., 520); forming active regions (e.g., 522(1)(1)-5222(1)(3)) including doping areas of the substrate; forming source/drain (S/D) regions (FIG. 5G) including doping first areas of the active regions, the S/D regions representing first transistor components, wherein second areas of the active regions which are between corresponding S/D regions are channel regions (FIG. 5G) representing second transistor components; forming metal-to-S/D (MD) contact structures over corresponding ones of the S/D regions, the MD contact structures representing third transistor components; and forming gate lines (FIG. 5G) over corresponding ones of the channel regions, the gate lines representing fourth transistor components. Block 702 includes block 704.

At block 704, the transistor-components are arranged to fit within a cell region. Examples of transistor-components being arranged within a cell region include transistors P11-P15, P28, P61, P81, N11-N15, N28, N61 and N81, and the transistors (not shown) in break 530 which are arranged within cell 500A, the latter being bounded by cell boundaries 503(1)-503(4), or the like. From block 704, flow exits block 702 and proceeds to block 706.

In FIG. 7, at block 706, transistor-components are connected to form corresponding active transistors. Examples of connecting transistor-components to form corresponding active transistors include forming gate conductors corresponding to the gate patterns of FIGS. 5A-5F, forming M_1st segments corresponding to the M_1st patterns of FIGS. 5A-5F, or the like. Block 706 includes blocks 708, 710 and 712. From block 706, flow proceeds to block 708.

At block 708, active transistors are configured to receive data at a data input node. Examples of active transistors configured to receive data at a data input node include transistors P13 and N15 which are connected to input node 406(1) and 460(2) in FIG. 4A, or the like. From block 708, flow proceeds to block 710.

At block 710, active transistors are configured to produce an output signal. Examples of active transistors configured to produce an output signal include active transistors P28 and N28 which are connected to output node 464 in FIG. 4A, or the like. From block 710, flow proceeds to block 712.

At block 712, terminals of capacitor-configured-transistors are connected to a target node. Examples of terminals of capacitor-configured-transistors connected to a target node include the gate terminals of each of capacitor-configured-transistors P71 and N71 which are connected to node 418 of FIG. 4B, the gate terminals of capacitor-configured-transistors P81 and N81 which are correspondingly connected to nodes 414 and 424 of FIG. 4C, or the like.

Figure 8:
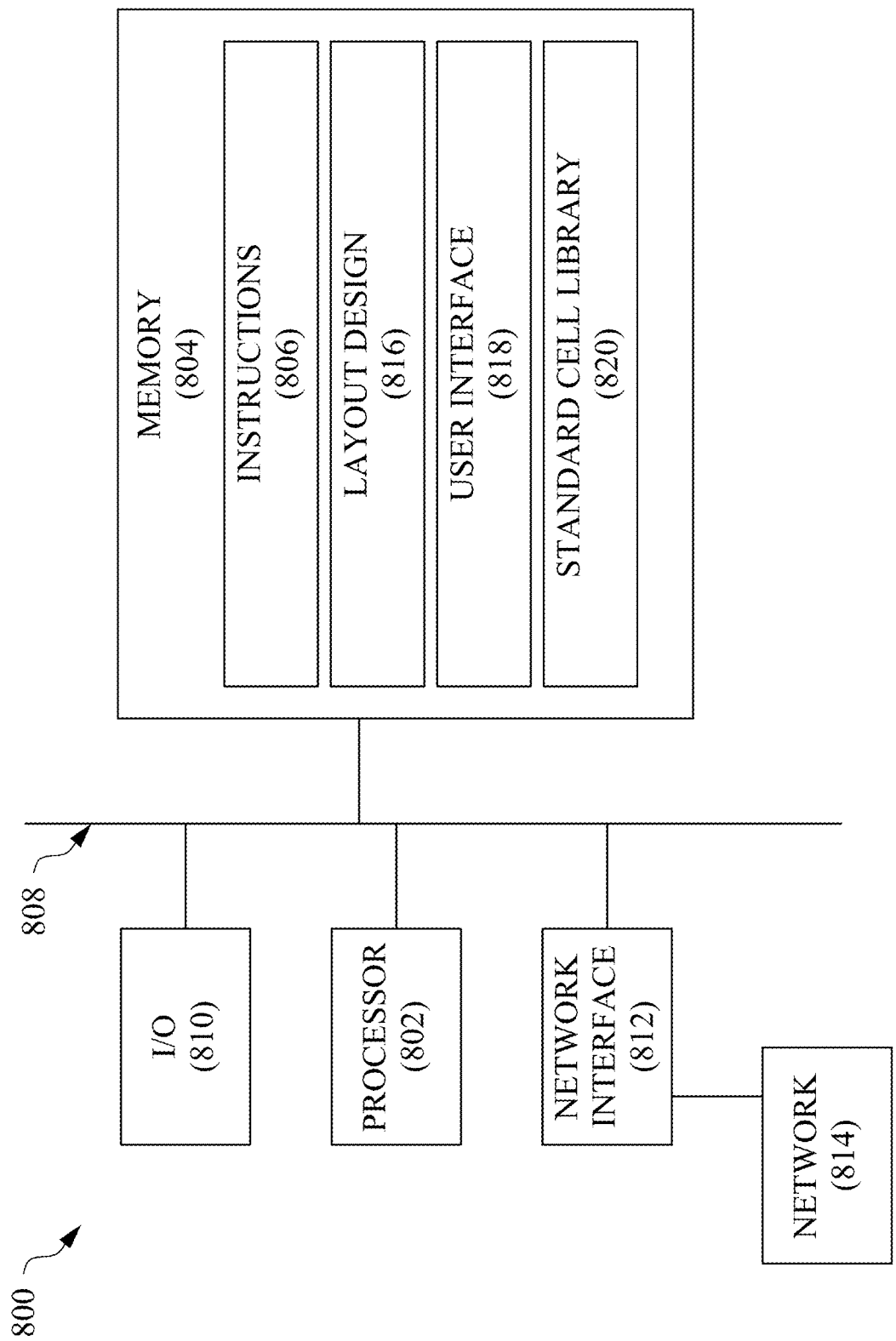
FIG. 8 is a block diagram of an electronic design automation (EDA) system in accordance with some embodiments.

FIG. 8 is a block diagram of an electronic design automation (EDA) system 800 in accordance with some embodiments.

In some embodiments, EDA system 800 includes an APR system. The method of flowchart 700 of FIG. 7 is implemented, for example, using EDA system 800, in accordance with some embodiments, in order to generate an instance revised dummy transistor structures 500A, 500B, 500C, 500D, 500E or 500F, or other suitable structures are within the contemplated scope of the disclosure.

In some embodiments, EDA system 800 is a general purpose computing device including a hardware processor 802 and a non-transitory, computer-readable storage medium 804. Storage medium 804, amongst other things, is encoded with, i.e., stores, computer program code 806, i.e., a set of executable instructions. Execution of instructions 806 by hardware processor 802 represents (at least in part) an EDA tool which implements a portion or all of, e.g., the methods of FIGS. 6A, 6B, and 7, in accordance with one or more embodiments (hereinafter, the noted processes and/or methods). Storage medium 804, amongst other things, stores layout diagram 816 that includes cells 500A, 500B, 500C, 500D, 500E and 500F, and other layout diagrams of the like within the scope of the present disclosure.

Processor 802 is electrically coupled to computer-readable storage medium 804 via a bus 808. Processor 802 is further electrically coupled to an I/O interface 810 by bus 808. A network interface 812 is further electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause system 800 (where such execution represents (at least in part) the EDA tool) to be usable for performing a portion or all of the noted processes and/or methods. In one or more embodiments, storage medium 804 further stores information which facilitates performing a portion or all of the noted processes and/or methods. In one or more embodiments, storage medium 804 stores library 820 of standard cells including such standard cells as disclosed herein.

EDA system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

EDA system 800 further includes network interface 812 coupled to processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 800.

System 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. EDA system 800 is configured to receive information related to a UI through I/O interface 810. The information is stored in computer-readable medium 804 as user interface (UI) 818.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 800. In some embodiments, a layout which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 9:
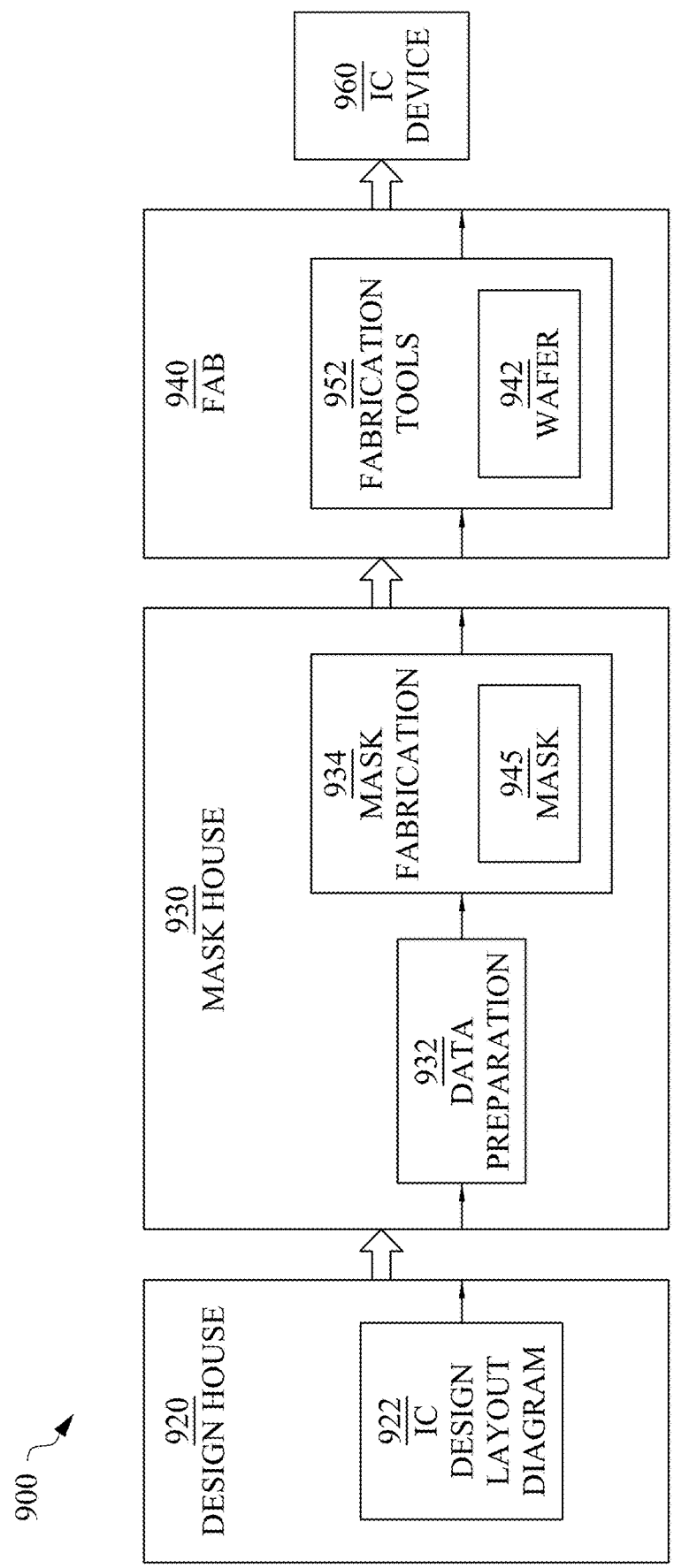
FIG. 9 is a block diagram of an integrated circuit (IC) manufacturing system, and an IC manufacturing flow associated therewith, in accordance with some embodiments.

FIG. 9 is a block diagram of an integrated circuit (IC) manufacturing system 900, and an IC manufacturing flow associated therewith, in accordance with some embodiments.

After block 616 of FIG. 6B, based on the layout, at least one of (A) one or more semiconductor masks or (B) at least one component in a layer of an inchoate semiconductor integrated circuit is fabricated using manufacturing system 900. In some embodiments, after block 702 of FIG. 7, based on the layout, at least one of (A) one or more semiconductor masks or (B) at least one component in a layer of an inchoate semiconductor integrated circuit is fabricated In FIG. 9, IC manufacturing system 900 includes entities, such as a design house 920, a mask house 930, and an IC manufacturer/fabricator ("fab") 940, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and supplies services to and/or receives services from one or more of the other entities. In some embodiments, two or more of design house 920, mask house 930, and IC fab 940 is owned by a single larger company. In some embodiments, two or more of design house 920, mask house 930, and IC fab 940 coexist in a common facility and use common resources.

Design house (or design team) 920 generates an IC design layout 922. IC design layout 922 includes various geometrical patterns designed for an IC device 960. The geometrical patterns correspond to patterns of metal, oxide, or semiconductor layers that make up the various components of IC device 960 to be fabricated. The various layers combine to form various IC features. For example, a portion of IC design layout 922 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout 922. The design procedure includes one or more of logic design, physical design or place and route. IC design layout 922 is presented in one or more data files having information of the geometrical patterns. For example, IC design layout 922 is expressed in a GDSII file format or DFII file format.

Mask house 930 includes data preparation 932 and mask fabrication 934. Mask house 930 uses IC design layout 922 to manufacture one or more masks to be used for fabricating the various layers of IC device 960 according to IC design layout 922. Mask house 930 performs mask data preparation 932, where IC design layout 922 is translated into a representative data file ("RDF"). Mask data preparation 932 supplies the RDF to mask fabrication 934. Mask fabrication 934 includes a mask writer. A mask writer converts the RDF to an image on a substrate, such as a mask (reticle) or a semiconductor wafer. The design layout is manipulated by mask data preparation 932 to comply with particular characteristics of the mask writer and/or requirements of IC fab 940. In FIG. 9, mask data preparation 932, mask fabrication 934, and mask 945 are illustrated as separate elements. In some embodiments, mask data preparation 932 and mask fabrication 934 are collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is further used, which treats OPC as an inverse imaging problem.

In some embodiments, mask data preparation 932 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 934, which may undo part of the modifications performed by OPC in order to meet mask creation rules.

In some embodiments, mask data preparation 932 includes lithography process checking (LPC) that simulates processing that will be implemented by IC fab 940 to fabricate IC device 960. LPC simulates this processing based on IC design layout 922 to fabricate a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been fabricated by LPC, if the simulated device is not close enough in shape to satisfy design rules, OPC and/or MRC are be repeated to further refine IC design layout 922.

The above description of mask data preparation 932 has been simplified for the purposes of clarity. In some embodiments, data preparation 932 includes additional features such as a logic operation (LOP) to modify the IC design layout according to manufacturing rules. Additionally, the processes applied to IC design layout 922 during data preparation 932 may be executed in a variety of different orders.

After mask data preparation 932 and during mask fabrication 934, a mask 945 or a group of masks are fabricated based on the modified IC design layout. In some embodiments, an electron-beam (e-beam) or a mechanism of multiple e-beams is used to form a pattern on a mask (photomask or reticle) based on the modified IC design layout. The masks are formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask is an attenuated PSM or alternating PSM. The mask(s) generated by mask fabrication 934 is used in a variety of processes. For example, such a mask(s) is used in an ion implantation process to form various doped regions in the semiconductor wafer, in an etching process to form various etching regions in the semiconductor wafer, and/or in other suitable processes.

IC fab 940 is an IC fabrication business that includes one or more manufacturing facilities for the fabrication of a variety of different IC products. In some embodiments, IC fab 940 is a semiconductor foundry. For example, there may be a manufacturing facility for the front end fabrication of a plurality of IC products (front-end-of-line (FEOL) fabrication), while a second manufacturing facility may supply the back end fabrication for the interconnection and packaging of the IC products (back-end-of-line (BEOL) fabrication), and a third manufacturing facility may supply other services for the foundry business.

IC fab 940 uses the mask (or masks) fabricated by mask house 930 to fabricate IC device 960 using fabrication tools 952. Thus, IC fab 940 at least indirectly uses IC design layout 922 to fabricate IC device 960. In some embodiments, a semiconductor wafer 942 is fabricated by IC fab 940 using the mask (or masks) to form IC device 960. Semiconductor wafer 942 includes a silicon substrate or other proper substrate having material layers formed thereon. Semiconductor wafer further includes one or more of various doped regions, dielectric features, multilevel interconnects, and the like (formed at subsequent manufacturing steps).

Details regarding an integrated circuit (IC) manufacturing system (e.g., system 900 of FIG. 9), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method of generating a cell in a layout diagram includes: selecting a cell from a library of standard cells, components of the cell defining an active circuit; identifying a dummy device within the cell that is disconnected from the active circuit within the cell; and connecting the dummy device to a target node of the active circuit.

In some embodiments, the identifying the dummy device identifies a transistor having a shorted-configuration (shorted-transistor) as the dummy device, the shorted-transistor including a gate pattern, a first source/drain (S/D) region and a second S/D region which are connected together; and the method further includes adapting the shorted-transistor to a transistor having a capacitor-configuration (capacitor-configured transistor); and the connecting the dummy device includes using the capacitor-configured transistor as the dummy device. In some embodiments, the adapting the shorted-transistor includes removing one or more first conductive segment shapes which connect the gate pattern to each of the first and second S/D regions of the shorted-transistor; and generating a second conductive segment shape connecting a data input line shape of the active circuit with the gate pattern of the shorted-transistor. In some embodiments, the removing one or more first conductive segment shapes results not only in the gate pattern being disconnected from each of the first and second S/D regions but further results in the first and second S/D regions being disconnected from each other; and the adapting the shorted-transistor further includes generating a third conductive segment shape connecting the first and second S/D regions together. In some embodiments, the adapting the dummy device is performed as part of an engineering change order.

In some embodiments, the target node is an input node of the active circuit; and the connecting the dummy device further includes connecting the dummy device in parallel with the input node of the active circuit. In some embodiments, the target node is an output node of an input transistor of the active circuit; and the connecting the dummy device further includes connecting the dummy device to the output node of the input transistor of the active circuit. In some embodiments, the target node is an output node of the active circuit; and the connecting the dummy device further includes connecting the dummy device to the output node of the active circuit. In some embodiments, the active circuit is a scan insertion D flip flop (SDFQ) that includes a multiplexer serially connected at an internal node to a D flip-flop (FF); the target node is the internal node of the SDFQ; and the connecting the dummy device further includes: connecting the dummy device to the internal node. In some embodiments, the slack violation includes a hold type of slack violation and a setup type of slack violation; the identifying a dummy device and the connecting a dummy device are directed to reducing the hold type of slack violation; and the method further includes modifying a frequency of the active circuit thereby to reduce the setup type of slack violation.

In some embodiments, a semiconductor device includes a cell region configured as a functional circuit, the cell region including active transistors which are arranged to fit within a rectangular area, one or more of the active transistors being configured correspondingly to receive data at a data-input node of the cell region and a clock at a timing-input node of the cell region, and one or more of the active transistors being configured to produce an output signal at an output node of the cell region; and one or more capacitor-configured transistors arranged within the rectangular area, a terminal of one or more of the capacitor-configured transistors being connected to a target node of the functional circuit.

In some embodiments, the target node is the input node of the cell region. In some embodiments, the target node is the output node of the cell region. In some embodiments, the functional circuit is a sequential logic circuit. In some embodiments, the semiconductor device is a scan insertion D flip-flop (SDFQ) that includes a multiplexer serially connected at an internal node to a D flip-flop (FF); and the target node is the internal node of the SDFQ.

In some embodiments, a method of forming semiconductor device includes: forming a substrate; forming active regions including doping areas of the substrate; forming source/drain (S/D) regions including doping first areas of the active regions, the S/D regions representing first transistor components, wherein second areas of the active regions which are between corresponding S/D regions are channel regions representing second transistor components; forming metal-to-S/D (MD) contact structures over corresponding ones of the S/D regions, the MD contact regions representing third transistor components; forming gate lines over corresponding ones of the channel regions, the gate lines representing fourth transistor components; the forming active regions, the forming S/D regions, the forming MD contact structures and the forming gate lines resulting in a first set of the first to fourth transistor-components connected as corresponding active transistors that define a functional circuit, and a second set of the first to fourth transistor-components connected as one or more corresponding capacitor-configured-transistors; the first and second sets of transistor-components fitting within a cell region having a rectangular area; and forming metallization to interconnect the active transistors and the one or more capacitor-configured transistors resulting in: one or more of the active transistors being configured to receive data at a data-input node of the cell region and a clock at a timing-input node of the cell region; one or more of the active transistors being configured to produce an output signal at an output node of the cell region; and a terminal of the one or more capacitor-configured transistors being connected to a target node of the functional circuit.

In some embodiments, the target node is the input node of the cell region. In some embodiments, the target node is the output node of the cell region. In some embodiments, the functional circuit is a sequential logic circuit. In some embodiments, the sequential logic circuit is a scan insertion D flip-flop (SDFQ) that includes a multiplexer serially connected at an internal node to a D flip-flop (FF); the sequential logic circuit is the D FF; and the target node is the internal node of the SDFQ.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of forming a semiconductor device, the method comprising:
    forming an active circuit of a cell, wherein forming the active circuit comprises:
        forming source/drain (S/D) regions including doping first areas of an active regions, the S/D regions representing first transistor components, wherein second areas of the active regions which are between corresponding S/D regions are channel regions representing second transistor components;
    identifying a dummy device within the cell, wherein the dummy device is disconnected from the active circuit within the cell; and
    connecting the dummy device to a target node of the active circuit.

2. The method of claim 1, wherein:
    the identifying the dummy device identifies a transistor having a shorted-configuration (shorted-transistor) as the dummy device, the shorted-transistor including a gate pattern, a first source/drain (S/D) shape and a second S/D region which are connected together; and
    the method further comprises:
        adapting the shorted-transistor to a transistor having a capacitor-configuration (capacitor-configured transistor); and
    the connecting the dummy device includes:
        using the capacitor-configured transistor as the dummy device.

3. The method of claim 2, wherein the adapting the shorted-transistor includes:
    removing one or more first conductive segment shapes which connect the gate pattern to each of the first and second S/D regions of the shorted-transistor; and
    generating a second conductive segment shape connecting a data input line shape of the active circuit with the gate pattern of the shorted-transistor.

4. The method of claim 3, wherein:
    the removing one or more first conductive segment shapes results not only in the gate pattern being disconnected from each of the first and second S/D regions but further results in the first and second S/D regions being disconnected from each other; and
    the adapting the shorted-transistor further includes:
        generating a third conductive segment shape connecting the first and second S/D regions together.

5. The method of claim 2, wherein the adapting the dummy device is performed as part of an engineering change order.

6. The method of claim 1, wherein:
    the target node is an input node of the active circuit; and
    the connecting the dummy device further includes:
        connecting the dummy device in parallel with the input node of the active circuit.

7. The method of claim 1, wherein:
    the target node is an output node of an input transistor of the active circuit; and
    the connecting the dummy device further includes:
        connecting the dummy device to the output node of the input transistor of the active circuit.

8. The method of claim 1, wherein:
    the target node is an output node of the active circuit; and
    the connecting the dummy device further includes:
        connecting the dummy device to the output node of the active circuit.

9. The method of claim 1, wherein:
    the active circuit is a scan insertion D flip flop (SDFQ) that includes a multiplexer serially connected at an internal node to a D flip-flop (FF);
    the target node is the internal node of the SDFQ; and
    the connecting the dummy device further includes:
        connecting the dummy device to the internal node.

10. The method of claim 1, wherein:
    the slack violation includes a hold type of slack violation and a setup type of slack violation;
    the identifying a dummy device and the connecting a dummy device are directed to reducing the hold type of slack violation; and
    the method further includes:
        modifying a frequency of the active circuit thereby to reduce the setup type of slack violation.

11. A method of forming semiconductor device, the method comprising:
    forming a substrate;
    forming active regions including doping areas of the substrate;
    forming source/drain (S/D) regions including doping first areas of the active regions, the S/D regions representing first transistor components, wherein second areas of the active regions which are between corresponding S/D regions are channel regions representing second transistor components;
    forming metal-to-S/D (MD) contact structures over corresponding ones of the S/D regions, the MD contact structures representing third transistor components;
    forming gate lines over corresponding ones of the channel regions, the gate lines representing fourth transistor components;
    the forming active regions, the forming S/D regions, the forming MD contact structures and the forming gate lines resulting in a first set of the first to fourth transistor-components connected as corresponding active transistors that define a functional circuit, and a second set of the first to fourth transistor-components connected as one or more corresponding capacitor-configured-transistors;

the first and second sets of transistor-components fitting within a cell region, the cell region having a rectangular area; and forming metallization to interconnect the active transistors and the one or more capacitor-configured transistors resulting in:
one or more of the active transistors being configured to receive data at a data-input node of the cell region and a clock at a timing-input node of the cell region;
one or more of the active transistors being configured to produce an output signal at an output node of the cell region; and
a terminal correspondingly of the one or more capacitor-configured transistors being connected to a target node of the functional circuit.

12. The method of claim 11, wherein the target node is the input node of the cell region.

13. The method of claim 11, wherein the target node is the output node of the cell region.

14. The method of claim 11, wherein the functional circuit is a sequential logic circuit.

15. The method of claim 14, wherein:
the sequential logic circuit is a scan insertion D flip-flop (SDFQ) that includes a multiplexer serially connected at an internal node to a D flip-flop (FF);
the sequential logic circuit is the D FF; and
the target node is the internal node of the SDFQ.

16. A method of forming semiconductor device, the method comprising:
forming active regions including doping areas of a substrate;
forming source/drain (S/D) regions including doping first areas of the active regions, the S/D regions representing first transistor components, wherein second areas of the active regions between corresponding S/D regions are channel regions representing second transistor components;
forming metal-to-S/D (MD) contact structures over corresponding ones of the S/D regions, the MD contact structures representing third transistor components;
forming gate lines over corresponding ones of the channel regions, the gate lines representing fourth transistor components,
wherein a first set of the first to fourth transistor-components define a functional circuit, and a second set of the first to fourth transistor-components define a capacitor-configured-transistor;
forming an interconnect electrically connecting a target node of the functional circuit with the capacitor-configured-transistor.

17. The method of claim 16, wherein the target node is an input node of the functional circuit.

18. The method of claim 16, wherein the target node is an output node of the functional circuit.

19. The method of claim 16, wherein the second set of the first to fourth transistor-components further defines a second capacitor-configured-transistor; and forming the interconnect comprises electrically connecting the capacitor-configured-transistor to the second capacitor-configured-transistor.

20. The method of claim 16, wherein forming the interconnect comprises electrically connecting the capacitor-configured-transistor to a plurality of active transistors in the functional circuit.

\* \* \* \* \*